United States Patent
Seo et al.

(10) Patent No.: US 9,844,085 B2
(45) Date of Patent: Dec. 12, 2017

(54) METHOD FOR ALLOCATING RESOURCE FOR DEVICE-TO-DEVICE COMMUNICATION IN WIRELESS COMMUNICATION SYSTEM AND APPARATUS THEREOF

(71) Applicant: LG ELECTRONICS INC., Seoul (KR)

(72) Inventors: Hanbyul Seo, Seoul (KR); Suckchel Yang, Seoul (KR); Myoungseob Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 14/773,635

(22) PCT Filed: Mar. 25, 2014

(86) PCT No.: PCT/KR2014/002493
§ 371 (c)(1),
(2) Date: Sep. 8, 2015

(87) PCT Pub. No.: WO2014/157911
PCT Pub. Date: Oct. 2, 2014

(65) Prior Publication Data
US 2016/0044724 A1 Feb. 11, 2016

Related U.S. Application Data

(60) Provisional application No. 61/805,142, filed on Mar. 25, 2013, provisional application No. 61/806,378, (Continued)

(51) Int. Cl.
*H04L 12/26* (2006.01)
*H04W 76/02* (2009.01)
(Continued)

(52) U.S. Cl.
CPC ......... *H04W 76/023* (2013.01); *H04L 1/1812* (2013.01); *H04L 5/00* (2013.01);
(Continued)

(58) Field of Classification Search
CPC .. H04W 4/005; H04W 76/023; H04L 5/0053; H04L 5/0058
See application file for complete search history.

(56) References Cited

U.S. PATENT DOCUMENTS 9,185,697 B2 * 11/2015 Kuchibhotla ....... H04W 76/023
2010/0240312 A1 9/2010 Peng
(Continued)

FOREIGN PATENT DOCUMENTS

| CN | 102547871 A | 7/2012 |
|----|-------------|--------|
| WO | 2011015250 A1 | 2/2011 |
| WO | 2012165881 A2 | 12/2012 |

*Primary Examiner* — Shaq Taha
(74) *Attorney, Agent, or Firm* — Dentons US LLP

(57) ABSTRACT

Disclosed in the present application is a method for transmitting/receiving a signal using device-to-device communication by a user equipment in a wireless communication system. More specifically, the method comprises the steps of: transmitting a first signal in contention slot included in one of a plurality of contention intervals; receiving, in response to the first signal, a second signal in the contention slot in which the first signal is transmitted; and transmitting/receiving a data signal or a response signal to the data signal in at least one time resource corresponding to the one of the plurality of contention intervals by using device-to-device communication.

4 Claims, 27 Drawing Sheets

Related U.S. Application Data filed on Mar. 28, 2013, provisional application No. 61/843,900, filed on Jul. 8, 2013, provisional application No. 61/876,212, filed on Sep. 10, 2013, provisional application No. 61/898,466, filed on Oct. 31, 2013, provisional application No. 61/902,273, filed on Nov. 10, 2013, provisional application No. 61/912,528, filed on Dec. 5, 2013, provisional application No. 61/925,631, filed on Jan. 9, 2014.

(51) Int. Cl.
*H04W 74/08* (2009.01)
*H04W 72/04* (2009.01)
*H04L 1/18* (2006.01)
*H04L 5/00* (2006.01)
*H04W 84/18* (2009.01)

(52) U.S. Cl.
CPC ....... *H04W 72/0446* (2013.01); *H04W 74/08* (2013.01); *H04W 74/0833* (2013.01); *H04W 84/18* (2013.01)

(56) References Cited

U.S. PATENT DOCUMENTS

| | | |
|---|---|---|
| 2011/0306349 A1 | 12/2011 | Hakola et al. |
| 2012/0028672 A1 | 2/2012 | Chen |
| 2012/0226930 A1* | 9/2012 | Colban ................ H04W 72/06 713/340 |
| 2012/0320856 A1 | 12/2012 | Kim et al. |
| 2013/0022010 A1 | 1/2013 | Qianxi et al. |
| 2013/0223352 A1* | 8/2013 | Sartori ................ H04W 76/023 370/329 |
| 2014/0321423 A1* | 10/2014 | Kalhan ............... H04W 76/023 370/330 |

* cited by examiner

FIG. 2
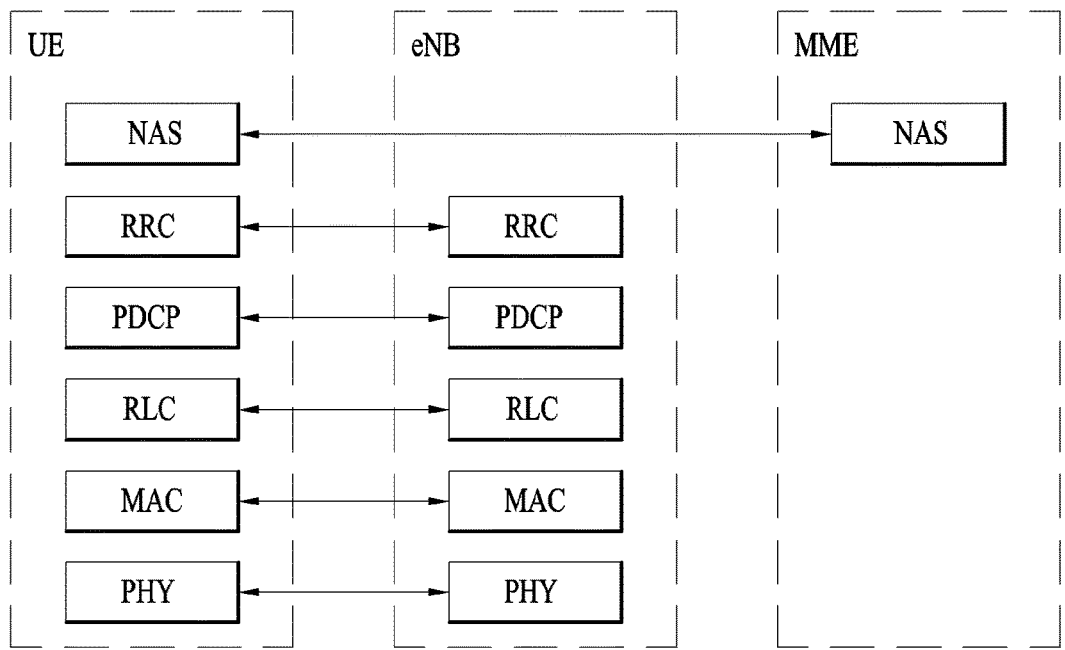
(a) Control - Plane Protocol Stack
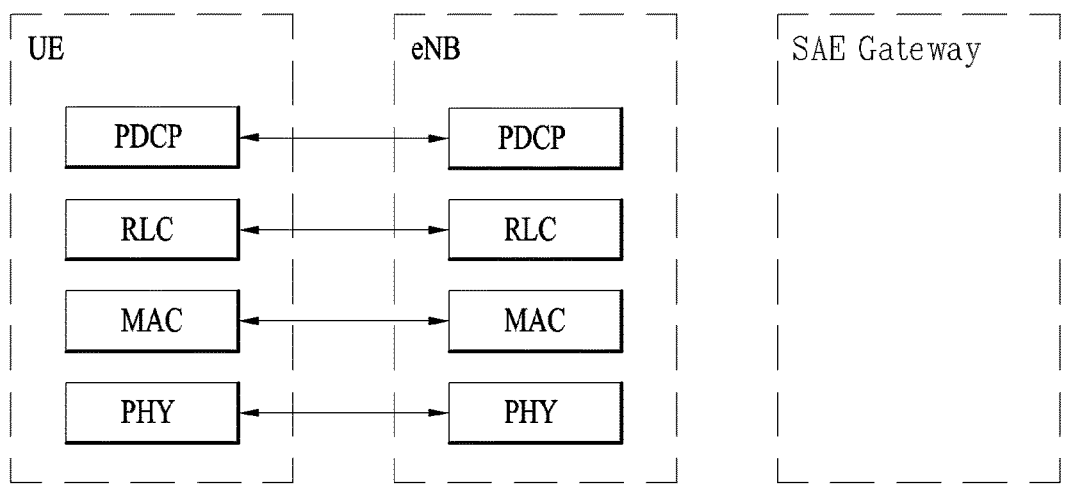
(b) User - Plane Protocol Stack FIG. 23
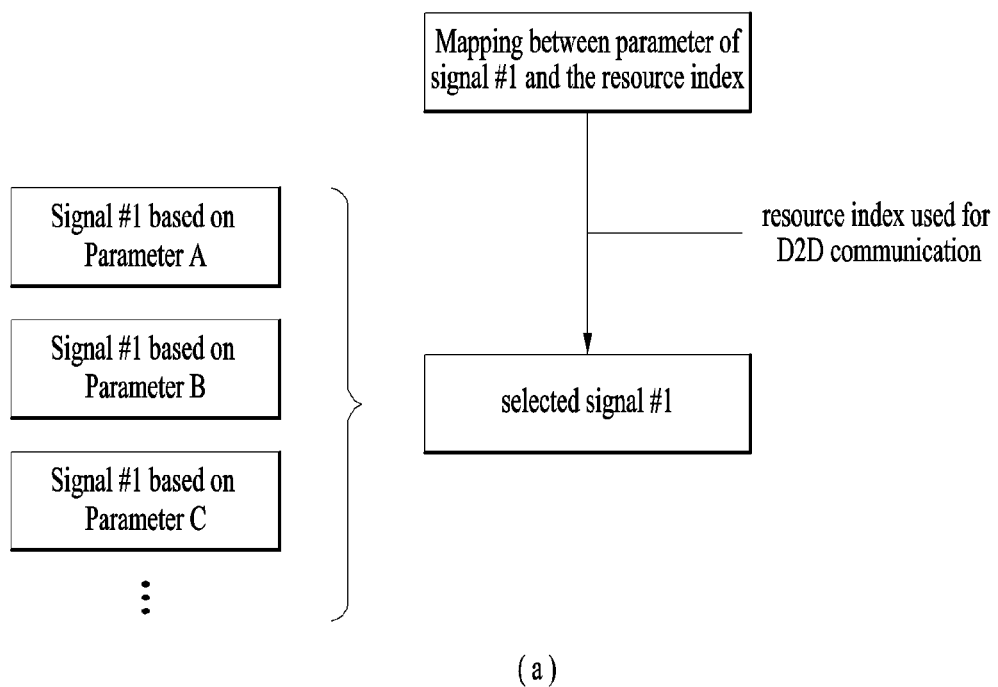
(a)
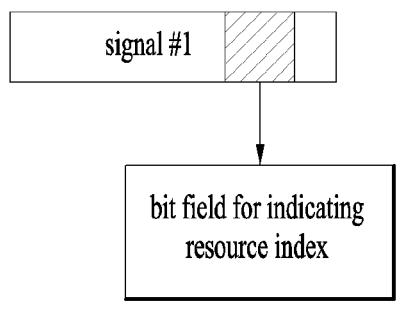
(b)

METHOD FOR ALLOCATING RESOURCE FOR DEVICE-TO-DEVICE COMMUNICATION IN WIRELESS COMMUNICATION SYSTEM AND APPARATUS THEREOF

This application is a 35 USC §371 National Stage entry of International Application No. PCT/KR2014/002493 filed on Mar. 25, 2014 and claims priority to U.S. Provisional Application No. 61/805,142, filed Mar. 25, 2013, U.S. Provisional Application No. 61/806,378, filed Mar 28, 2013, U.S. Provisional Application No. 61/843,900, filed Jul. 8, 2013, U.S. Provisional Application No. 61/876,212, filed Sep. 10, 2013, U.S. Provisional Application No. 61/898,466, filed Oct. 31, 2013, U.S. Provisional Application No. 61,902,273, filed Nov. 10, 2013, U.S. Provisional Application No. 61/912,528, filed Dec. 5, 2013, and U.S. Provisional Application No. 61/925,631, filed Jan. 9, 2014, all of which are incorporated by reference in their entirety herein.

TECHNICAL FIELD

The present invention relates to a wireless communication system, and more particularly to a method and apparatus for allocating resources for UE-to-UE communication in a wireless communication system.

BACKGROUND ART

3GPP LTE (3rd generation partnership project long term evolution hereinafter abbreviated LTE) communication system is schematically explained as an example of a wireless communication system to which the present invention is applicable.

FIG. 1 is a schematic diagram of E-UMTS network structure as one example of a wireless communication system. E-UMTS (evolved universal mobile telecommunications system) is a system evolved from a conventional UMTS (universal mobile telecommunications system). Currently, basic standardization works for the E-UMTS are in progress by 3GPP. E-UMTS is called LTE system in general. Detailed contents for the technical specifications of UMTS and E-UMTS refers to release 7 and release 8 of "3rd generation partnership project; technical specification group radio access network", respectively.

Referring to FIG. 1, E-UMTS includes a user equipment (UE), an eNode B (eNB), and an access gateway (hereinafter abbreviated AG) connected to an external network in a manner of being situated at the end of a network (E-UTRAN). The eNode B may be able to simultaneously transmit multi data streams for a broadcast service, a multicast service and/or a unicast service.

One eNode B contains at least one cell. The cell provides a downlink transmission service or an uplink transmission service to a plurality of user equipments by being set to one of 1.25 MHz, 2.5 MHz, 5 MHz, 10 MHz, 15 MHz, and 20 MHz of bandwidths. Different cells can be configured to provide corresponding bandwidths, respectively. An eNode B controls data transmissions/receptions to/from a plurality of the user equipments. For a downlink (hereinafter abbreviated DL) data, the eNode B informs a corresponding user equipment of time/frequency region on which data is transmitted, coding, data size, HARQ (hybrid automatic repeat and request) related information and the like by transmitting DL scheduling information. And, for an uplink (hereinafter abbreviated UL) data, the eNode B informs a corresponding user equipment of time/frequency region usable by the corresponding user equipment, coding, data size, HARQ-related information and the like by transmitting UL scheduling information to the corresponding user equipment. Interfaces for user-traffic transmission or control traffic transmission may be used between eNode Bs. A core network (CN) consists of an AG (access gateway) and a network node for user registration of a user equipment and the like. The AG manages a mobility of the user equipment by a unit of TA (tracking area) consisting of a plurality of cells.

Wireless communication technologies have been developed up to LTE based on WCDMA. Yet, the ongoing demands and expectations of users and service providers are consistently increasing. Moreover, since different kinds of radio access technologies are continuously developed, a new technological evolution is required to have a future competitiveness. Cost reduction per bit, service availability increase, flexible frequency band use, simple structure/open interface and reasonable power consumption of user equipment and the like are required for the future competitiveness.

DISCLOSURE

Technical Problem

An object of the present invention is to provide a method and apparatus for allocating resources for UE-to-UE communication in a wireless communication system.

Technical Solution

The objects of the present invention can be achieved by providing a method for transmitting and receiving a signal through UE-to-UE communication by a user equipment (UE) in a wireless communication system including: transmitting a first signal in a contention slot contained in one contention section from among a plurality of contention sections; receiving a second signal as a response to the first signal in the contention slot in which the first signal is transmitted; and transmitting/receiving a data signal or a response signal to the data signal, using UE-to-UE communication in one or more time resources corresponding to the one contention section.

The transmitting the first signal may include: generating a random number; and if the random number is equal to or less than a predetermined value, transmitting the first signal in the contention slot.

In accordance with another aspect of the present invention, a user equipment (UE) for performing UE-to-UE communication in a wireless communication system includes: a radio frequency (RF) module configured to transmit/receive a signal to and from a base station (BS) or a counterpart UE of the UE-to-UE communication; and a processor configured to process the signal. When the processor transmits a first signal in a contention slot contained in one contention section from among a plurality of contention sections, and receives a second signal as a response to the first signal in the contention slot in which the first signal is transmitted, the processor may control the RF module to transmit/receive a data signal or a response signal to the data signal using UE-to-UE communication in one or more time resources corresponding to the one contention section.

The processor may generate a random number, and control the RF module to transmit the first signal in the contention slot when the random number is equal to or less than a predetermined value.

The number of contention slots contained in each of the plurality of contention sections may be determined on the basis of the number of the time resources.

The positions of frequency resources for the data signal and the response signal may be determined on the basis of the position of frequency resource through which the first signal is transmitted. The first signal may include specific information regarding the positions of frequency resources for the data signal and the response signal.

The first signal may include information regarding a frequency bandwidth for the data signal and the response signal.

Advantageous Effects

According to exemplary embodiments of the present invention, the embodiments of the present invention can more effectively perform UE-to-UE communication in a wireless communication system.

It will be appreciated by persons skilled in the art that that the effects that can be achieved through the present invention are not limited to what has been particularly described hereinabove and other advantages of the present invention will be more clearly understood from the following detailed description.

DESCRIPTION OF DRAWINGS

FIG. 2 is a diagram showing a control plane and a user plane of a radio interface protocol architecture between a User Equipment (UE) and an Evolved Universal Terrestrial Radio Access Network (E-UTRAN) based on a 3rd Generation Partnership Project (3GPP) radio access network standard.

FIG. 23 illustrates another allocation example of a time resource and a frequency resource for use in a D2D frame according to an embodiment of the present invention.

BEST MODE

Figure 1:
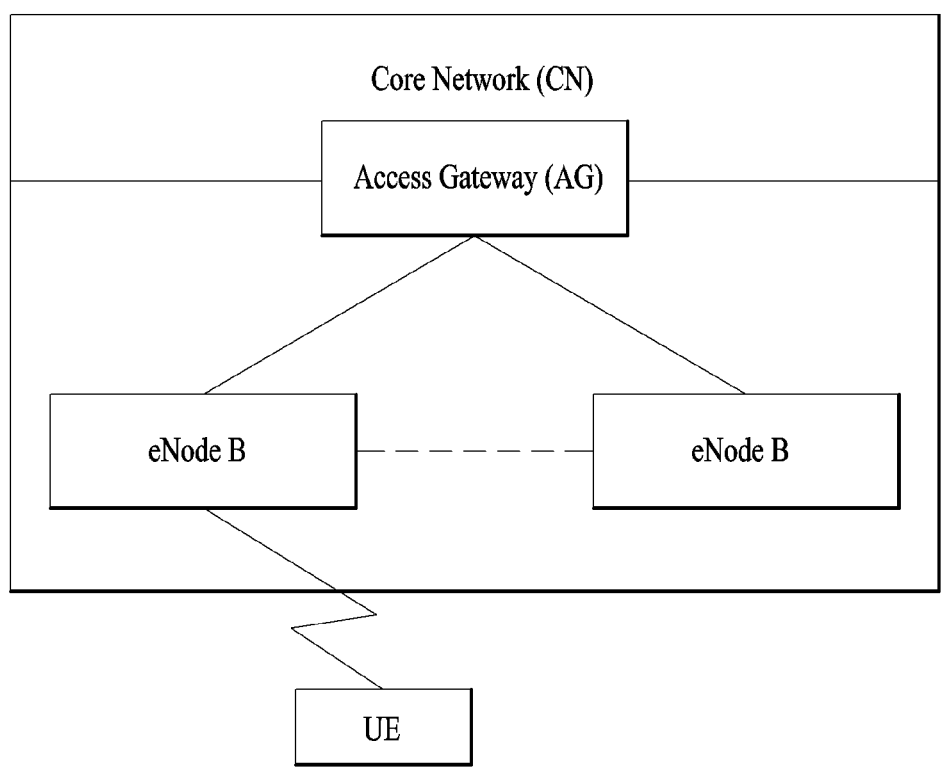
FIG. 1 is a diagram showing a network structure of an Evolved Universal Mobile Telecommunications System (E-UMTS) as an example of a wireless communication system.

In the following description, compositions of the present invention, effects and other characteristics of the present invention can be easily understood by the embodiments of the present invention explained with reference to the accompanying drawings. Embodiments explained in the following description are examples of the technological features of the present invention applied to 3GPP system.

In this specification, the embodiments of the present invention are explained using an LTE system and an LTE-A system, which is exemplary only. The embodiments of the present invention are applicable to various communication systems corresponding to the above mentioned definition. In particular, although the embodiments of the present invention are described in the present specification on the basis of FDD, this is exemplary only. The embodiments of the present invention may be easily modified and applied to H-FDD or TDD.

FIG. 2 is a diagram for structures of control and user planes of radio interface protocol between a 3GPP radio access network standard-based user equipment and E-UTRAN. The control plane means a path on which control messages used by a user equipment (UE) and a network to manage a call are transmitted. The user plane means a path on which such a data generated in an application layer as audio data, internet packet data, and the like are transmitted.

A physical layer, which is a 1st layer, provides higher layers with an information transfer service using a physical channel. The physical layer is connected to a medium access control layer situated above via a transport channel (trans antenna port channel). Data moves between the medium access control layer and the physical layer on the transport channel. Data moves between a physical layer of a transmitting side and a physical layer of a receiving side on the physical channel. The physical channel utilizes time and frequency as radio resources. Specifically, the physical layer is modulated by OFDMA (orthogonal frequency division multiple access) scheme in DL and the physical layer is modulated by SC-FDMA (single carrier frequency division multiple access) scheme in UL.

Medium access control (hereinafter abbreviated MAC) layer of a 2nd layer provides a service to a radio link control (hereinafter abbreviated RLC) layer, which is a higher layer, on a logical channel. The RLC layer of the 2nd layer supports a reliable data transmission. The function of the RLC layer may be implemented by a function block within the MAC. PDCP (packet data convergence protocol) layer of the 2nd layer performs a header compression function to reduce unnecessary control information, thereby efficiently transmitting such IP packets as IPv4 packets and IPv6 packets in a narrow band of a radio interface.

Radio resource control (hereinafter abbreviated RRC) layer situated in the lowest location of a 3rd layer is defined on a control plane only. The RRC layer is responsible for control of logical channels, transport channels and physical channels in association with a configuration, a re-configuration and a release of radio bearers (hereinafter abbreviated RBs). The RB indicates a service provided by the 2nd layer for a data delivery between the user equipment and the network. To this end, the RRC layer of the user equipment and the RRC layer of the network exchange a RRC message with each other. In case that there is an RRC connection (RRC connected) between the user equipment and the RRC layer of the network, the user equipment lies in the state of RRC connected (connected mode). Otherwise, the user equipment lies in the state of RRC idle (idle mode). A non-access stratum (NAS) layer situated at the top of the RRC layer performs such a function as a session management, a mobility management and the like.

A single cell consisting of an eNode B (eNB) is set to one of 1.25 MHz, 2.5 MHz, 5 MHz, 10 MHz, 15 MHz, and 20 MHz of bandwidths and then provides a downlink or uplink transmission service to a plurality of user equipments. Different cells can be configured to provide corresponding bandwidths, respectively.

DL transport channels for transmitting data from a network to a user equipment include a BCH (broadcast channel) for transmitting a system information, a PCH (paging channel) for transmitting a paging message, a downlink SCH (shared channel) for transmitting a user traffic or a control message and the like. DL multicast/broadcast service traffic or a control message may be transmitted on the DL SCH or a separate DL MCH (multicast channel). Meanwhile, UL transport channels for transmitting data from a user equipment to a network include a RACH (random access channel) for transmitting an initial control message, an uplink SCH (shared channel) for transmitting a user traffic or a control message. A logical channel, which is situated above a transport channel and mapped to the transport channel, includes a BCCH (broadcast channel), a PCCH (paging control channel), a CCCH (common control channel), a MCCH (multicast control channel), a MTCH (multicast traffic channel) and the like.

Figure 3:
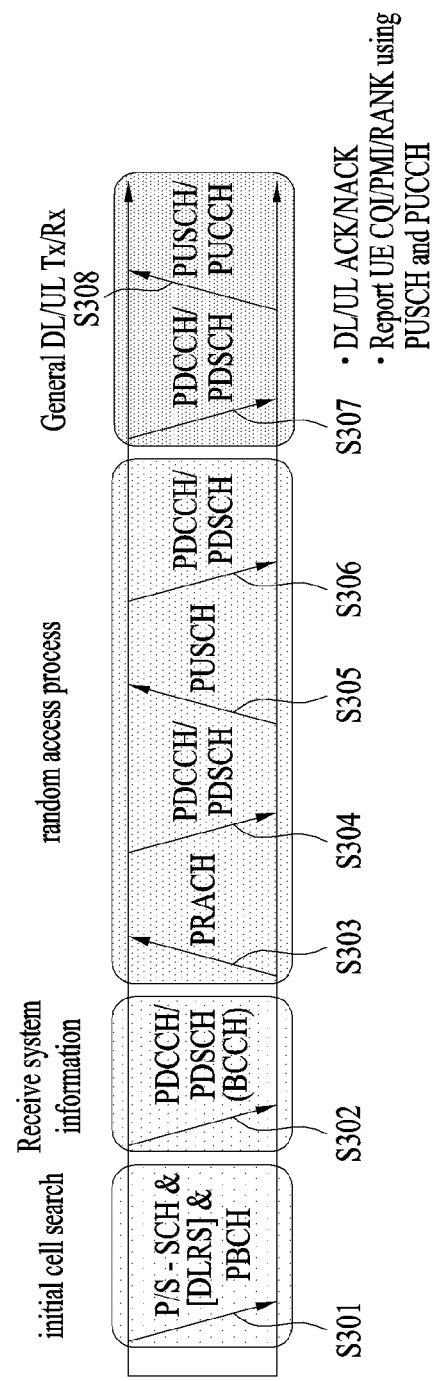
FIG. 3 is a diagram showing physical channels used in a 3GPP system and a general signal transmission method using the same.

FIG. 3 is a diagram for explaining physical channels used for 3GPP system and a general signal transmission method using the physical channels.

If a power of a user equipment is turned on or the user equipment enters a new cell, the user equipment may perform an initial cell search job for matching synchronization with an eNode B and the like [S301]. To this end, the user equipment may receive a primary synchronization channel (P-SCH) and a secondary synchronization channel (S-SCH) from the eNode B, may be synchronized with the eNode B and may then obtain information such as a cell ID and the like. Subsequently, the user equipment may receive a physical broadcast channel from the eNode B and may be then able to obtain intra-cell broadcast information. Meanwhile, the user equipment may receive a downlink reference signal (DL RS) in the initial cell search step and may be then able to check a DL channel state.

Having completed the initial cell search, the user equipment may receive a physical downlink shared control channel (PDSCH) according to a physical downlink control channel (PDCCH) and an information carried on the physical downlink control channel (PDCCH). The user equipment may be then able to obtain a detailed system information [S302].

Meanwhile, if a user equipment initially accesses an eNode B or does not have a radio resource for transmitting a signal, the user equipment may be able to perform a random access procedure to complete the access to the eNode B [S303 to S306]. To this end, the user equipment may transmit a specific sequence as a preamble on a physical random access channel (PRACH) [S303/S305] and may be then able to receive a response message on PDCCH and the corresponding PDSCH in response to the preamble [S304/S306]. In case of a contention based random access procedure (RACH), it may be able to additionally perform a contention resolution procedure.

Having performed the above mentioned procedures, the user equipment may be able to perform a PDCCH/PDSCH reception [S307] and a PUSCH/PUCCH (physical uplink shared channel/physical uplink control channel) transmission [S308] as a general uplink/downlink signal transmission procedure. In particular, the user equipment receives a DCI (downlink control information) on the PDCCH. In this case, the DCI contains such a control information as an information on resource allocation to the user equipment. The format of the DCI varies in accordance with its purpose.

Meanwhile, control information transmitted to an eNode B from a user equipment via UL or the control information received by the user equipment from the eNode B includes downlink/uplink ACK/NACK signals, CQI (Channel Quality Indicator), PMI (Precoding Matrix Index), RI (Rank Indicator) and the like. In case of 3GPP LTE system, the user equipment may be able to transmit the aforementioned control information such as CQI/PMI/RI and the like on PUSCH and/or PUCCH.

Figure 4:
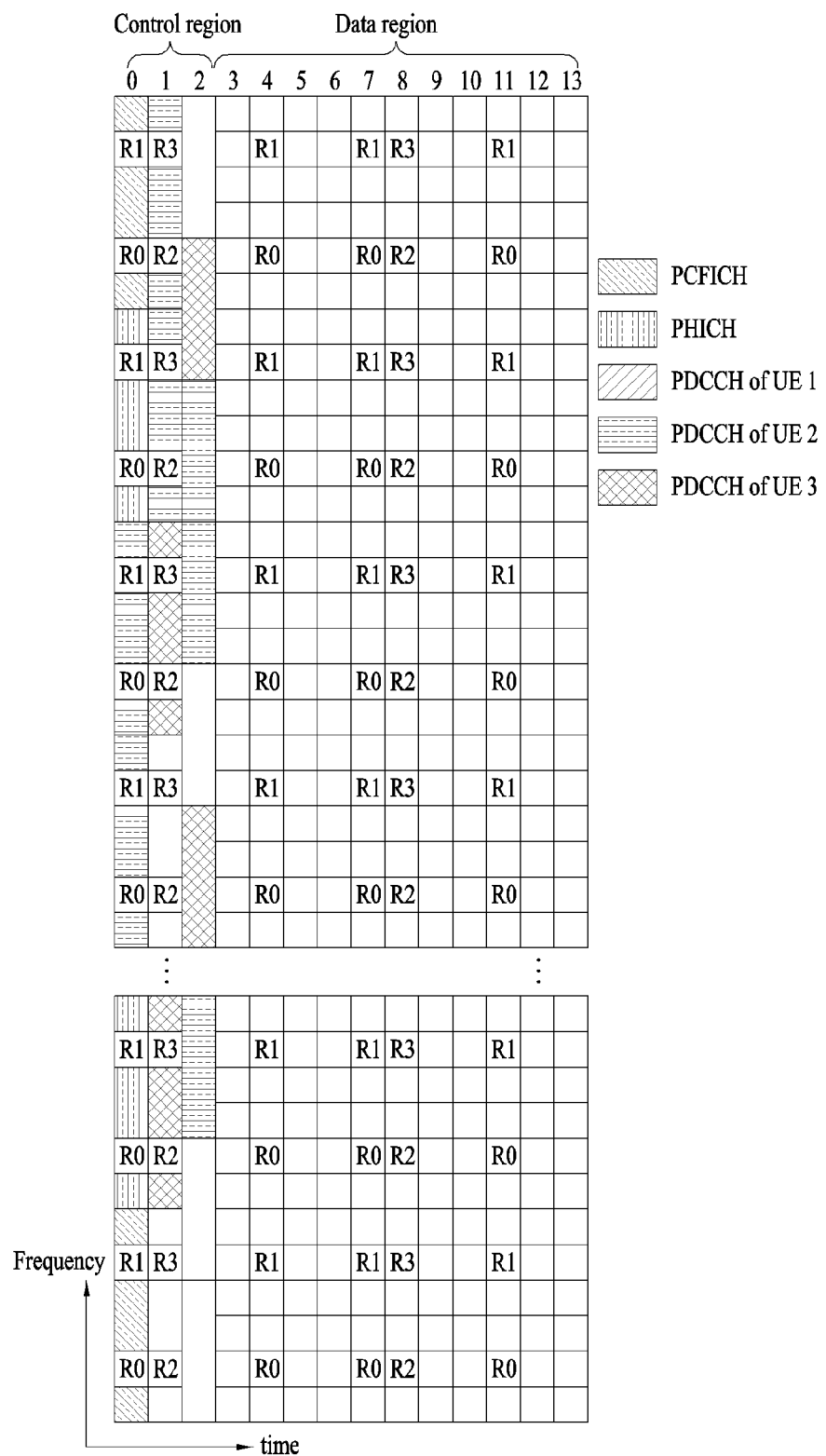
FIG. 4 is a diagram showing the structure of a downlink radio frame used in a Long Term Evolution (LTE) system.

FIG. 4 illustrates exemplary control channels included in a control region of a subframe in a DL radio frame.

Figure 5:
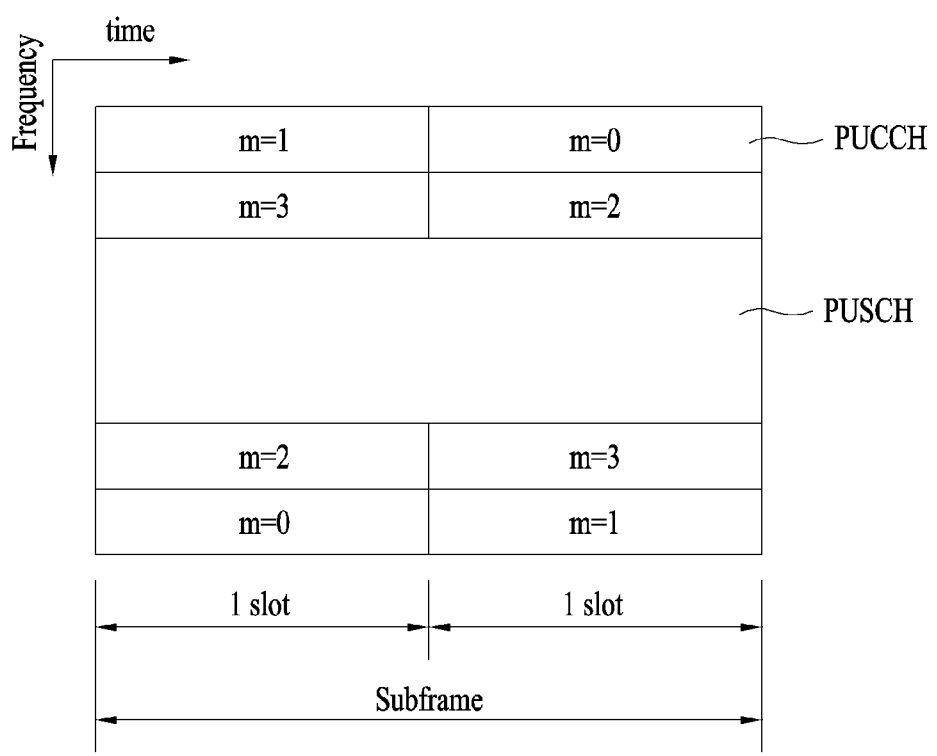
FIG. 5 is a diagram showing the structure of an uplink subframe used in an LTE system.

Referring to FIG. 4, a subframe includes 14 OFDM symbols. The first one to three OFDM symbols of a subframe are used for a control region and the other 13 to 11 OFDM symbols are used for a data region according to a subframe configuration. In FIG. 5, reference characters R1 to R4 denote RSs or pilot signals for antenna 0 to antenna 3. RSs are allocated in a predetermined pattern in a subframe irrespective of the control region and the data region. A control channel is allocated to non-RS resources in the control region and a traffic channel is also allocated to non-RS resources in the data region. Control channels allocated to the control region include a Physical Control Format Indicator Channel (PCFICH), a Physical Hybrid-ARQ Indicator Channel (PHICH), a Physical Downlink Control Channel (PDCCH), etc.

The PCFICH is a physical control format indicator channel carrying information about the number of OFDM symbols used for PDCCHs in each subframe. The PCFICH is located in the first OFDM symbol of a subframe and configured with priority over the PHICH and the PDCCH. The PCFICH includes 4 Resource Element Groups (REGs), each REG being distributed to the control region based on a cell Identifier (ID). One REG includes 4 Resource Elements (REs). An RE is a minimum physical resource defined by one subcarrier by one OFDM symbol. The PCFICH is set to 1 to 3 or 2 to 4 according to a bandwidth. The PCFICH is modulated in Quadrature Phase Shift Keying (QPSK).

The PHICH is a physical Hybrid-Automatic Repeat and request (HARQ) indicator channel carrying an HARQ ACK/NACK for a UL transmission. That is, the PHICH is a channel that delivers DL ACK/NACK information for UL HARQ. The PHICH includes one REG and is scrambled cell-specifically. An ACK/NACK is indicated in one bit and modulated in Binary Phase Shift Keying (BPSK). The modulated ACK/NACK is spread with a Spreading Factor (SF) of 2 or 4. A plurality of PHICHs mapped to the same resources form a PHICH group. The number of PHICHs multiplexed into a PHICH group is determined according to the number of spreading codes. A PHICH (group) is repeated three times to obtain a diversity gain in the frequency domain and/or the time domain.

The PDCCH is a physical DL control channel allocated to the first n OFDM symbols of a subframe. Herein, n is 1 or a larger integer indicated by the PCFICH. The PDCCH occupies one or more CCEs. The PDCCH carries resource allocation information about transport channels, PCH and DL-SCH, a UL scheduling grant, and HARQ information to each UE or UE group. The PCH and the DL-SCH are transmitted on a PDSCH. Therefore, an eNB and a UE transmit and receive data usually on the PDSCH, except for specific control information or specific service data.

Information indicating one or more UEs to receive PDSCH data and information indicating how the UEs are supposed to receive and decode the PDSCH data are delivered on a PDCCH. For example, on the assumption that the Cyclic Redundancy Check (CRC) of a specific PDCCH is masked by Radio Network Temporary Identity (RNTI) "A" and information about data transmitted in radio resources (e.g. at a frequency position) "B" based on transport format information (e.g. a transport block size, a modulation scheme, coding information, etc.) "C" is transmitted in a specific subframe, a UE within a cell monitors, that is, blind-decodes a PDCCH using its RNTI information in a search space. If one or more UEs have RNTI "A", these UEs receive the PDCCH and receive a PDSCH indicated by "B" and "C" based on information of the received PDCCH.

FIG. 5 illustrates a structure of a UL subframe in the LTE system.

Referring to FIG. 5, a UL subframe may be divided into a control region and a data region. A Physical Uplink Control Channel (PUCCH) including Uplink Control Information (UCI) is allocated to the control region and a Physical uplink Shared Channel (PUSCH) including user data is allocated to the data region. The middle of the subframe is allocated to the PUSCH, while both sides of the data region in the frequency domain are allocated to the PUCCH. Control information transmitted on the PUCCH may include an HARQ ACK/NACK, a CQI representing a downlink channel state, an RI for MIMO, a Scheduling Request (SR) requesting UL resource allocation. A PUCCH for one UE occupies one RB in each slot of a subframe. That is, the two RBs allocated to the PUCCH are frequency-hopped over the slot boundary of the subframe. Particularly, PUCCHs with m=0, m=1, m=2, and m=3 are allocated to a subframe in FIG. 5.

Figure 6:
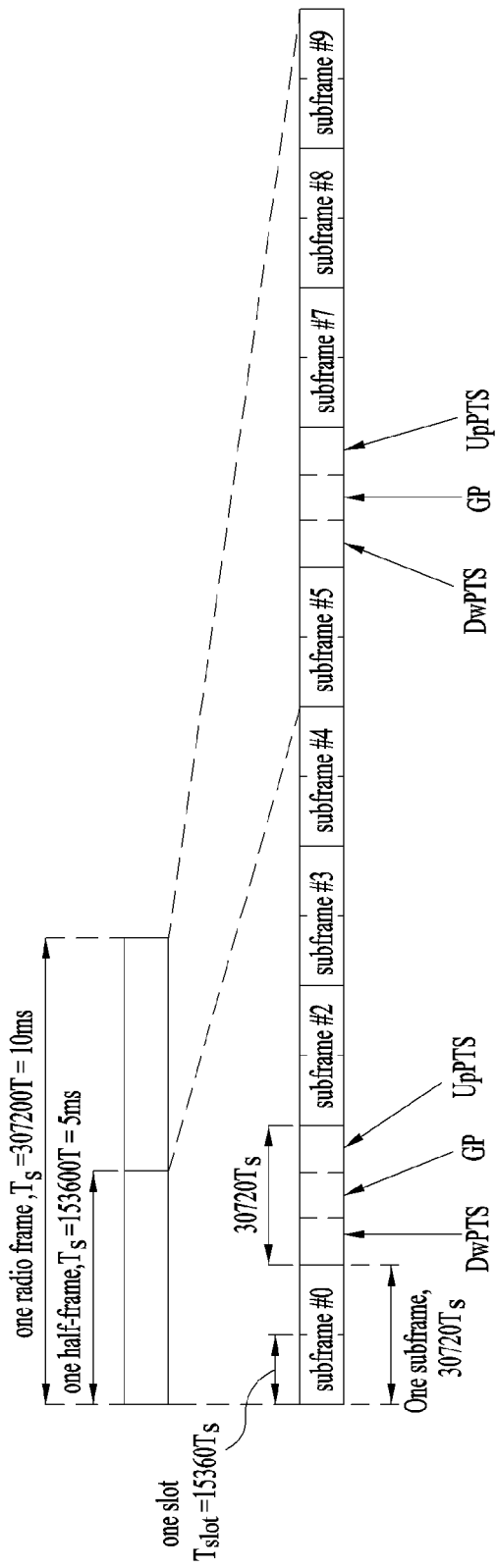
FIG. 6 illustrates a structure of a radio frame in an LTE TDD system.

FIG. 6 illustrates a structure of a radio frame in an LTE TDD system. In the LTE TDD system, a radio frame includes two half frames, and each half frame includes four normal subframes each including two slots, and a special subframe including a downlink pilot time slot (DwPTS), a guard period (GP), and an uplink pilot time slot (UpPTS).

In the special subframe, the DwPTS is used for initial cell search, synchronization, or channel estimation in a UE. The UpPTS is used for channel estimation in an eNB and uplink transmission synchronization of a UE. That is, the DwPTS is used for downlink transmission and the UpPTS is used for uplink transmission. In particular, the UpPTS is used for transmission of a PRACH preamble or SRS. In addition, the GP is a period for removing interference generated in uplink due to multipath delay of a downlink signal between uplink and downlink.

Meanwhile, in an LTE TDD system, a UL/DL configuration is shown in Table 1 below.

TABLE 1

| Uplink-downlink configuration | Downlink-to-Uplink Switch-point periodicity | subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1 above, D, U, and S refer to a downlink subframe, an uplink subframe, and the special subframe. In addition, Table 1 also shows downlink-to-uplink switch-point periodicity in an uplink/downlink subframe configuration in each system.

Figure 7:
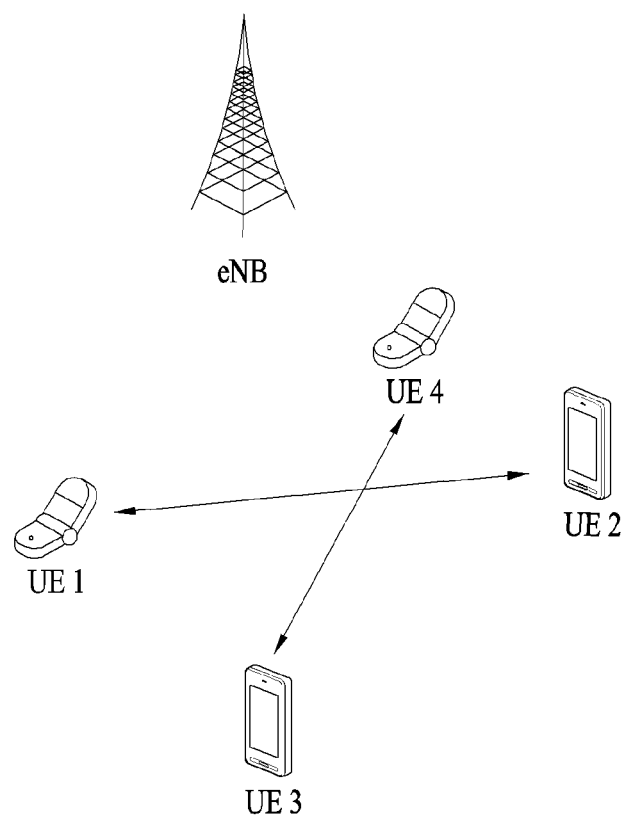
FIG. 7 is a diagram illustrating the concept of device-to-device (D2D) communication.

FIG. 7 is a diagram illustrating the concept of Device to Device (D2D) communication.

Referring to FIG. 7, UE1 and UE2 may be configured to perform UE to UE communication therebetween, and UE3 and UE4 may also be configured to perform UE to UE communication therebetween. The eNB may control the position of time/frequency resources, Tx power, etc. for UE to UE communication through an appropriate control signal. However, if UEs located outside the eNB coverage are present, UE to UE communication may be performed without receiving a control signal from the eNB. For convenience of description and better understanding of the present invention, UE to UE communication will hereinafter be referred to as D2D (Device to Device) communication.

First, the scheduling operation of a basic D2D link assumed in the present invention will hereinafter be described in detail.

A user equipment (UE) attempting to transmit a D2D signal may transmit a signal indicating that the UE attempts to transmit the signal. For convenience of description, this signal will hereinafter be referred to as Signal #1. Signal #1 may be comprised of predetermined signatures. In order to facilitate such scheduling, a variety of information of a Tx UE (e.g., ID of the Tx UE, a buffer state of the Tx UE, etc.). In more detail, information of the Tx UE is encoded through channel coding such that a codeword shape may appear. Alternatively, some signatures from among a plurality of signatures may be transmitted according to information of the Tx UE, or only one of the plurality of signatures is stochastically selected so that the selected signature may be transmitted according to information of the Tx UE.

Since several UEs can simultaneously transmit the signal #1, two or more sections through which the signal #1 can be transmitted may be defined, and each UE may stochastically select only one section and then transmit the signal #1 through the selected section. As a result, several UEs can stochastically transmit the signal #1 through different sections.

In this case, the probability with which the UE can transmit the signal #1 may indicate that it is determined whether the UE can transmit the signal #1 in each contention slot. For similar operations, the UE may generate a predetermined arbitrary number in advance, may set the arbitrary number to an initial value of a contention counter, and may reduce the counter by a predetermined number at intervals of each contention slot. If the counter reaches a predetermined value, the signal #1 may be transmitted. In this case, the range of an arbitrary number generated by the UE (for example, a maximum value of an arbitrary number) is adjusted, such that the transmission probability of the signal #1 can be adjusted. In other words, if a maximum value of the arbitrary number is increased, the Tx probability may be decreased. Specifically, if an initial value is higher than the number of one contention section, the counter is not re-initialized although one contention section is ended. In more detail, when several UEs perform contention throughout two or more contention sections and one UE occupies the subframe in the contention section #1, another UE can occupy the subframe in the contention section #2. Generally, it is assumed that the contention counter has the value of 1~Nmax, and the contention counter is reduced by one for each contention slot such that data is transmitted at a specific time at which the contention counter is set to zero, this means that the transmission probability of the signal #1 in each contention slot may be set to 1/Nmax.

In the meantime, the UE having received the signal #1 may transmit a signal indicating that the Tx UE can initiate D2D data transmission, such that a response message to the signal #E1 can be generated. This signal will hereinafter be denoted by Signal #2. Especially, information regarding the signal #1 may be contained in the signal #2, such that the UE having received the signal #2 can recognize whether the corresponding signal #2 is a response to the signal #1 transmitted from the UE. For example, the signature used in the signal #1 or ID information of the UE having transmitted the signal #1 may be contained in the signal #2. The UE, that has transmitted the signal #1 and received the signal #2 as a response to the signal #1, may determine that D2D communication is possible, such that the UE can perform D2D data transmission. As a result, the above-mentioned operation may be regarded as the D2D link scheduling operation because data transmission of a specific D2D link is decided at a specific time.

If one UE transmits the signal #1 and a UE having received the signal #2 generates the signal #2 as a response to the signal #1, predetermined resources are allocated and the allocation result may be utilized as D2D communication between the UEs. Since the signal #1 and the signal #2 are stochastically transmitted and received, the operation for guaranteeing the D2D communication resources may be referred to as contention based resource reservation, and a time section in which only one transmission of the signal #1 and only one responding of the signal #2 may be referred to as a contention slot. As described above, several contention slots are needed in a manner that several UEs can stochastically transmit the signal #1, and a set (or aggregate) of a series of contention slots configured to contend for the same resource may be referred to as a contention section. The D2D link, which has successfully exchanged the signal #1 and the signal #2 within one contention section, may have the authority to use resources interacting with the corresponding contention section.

If one contention section is ended, each UE may determine whether to intervene in data transmission/reception within a time section interacting with the corresponding contention section. Therefore, the UE, that does not transmit or receive the signal #1 or the signal #2 associated with the UE in the contention section, may switch off the Tx/Rx circuit on the basis of the fact that there is no Tx/Rx operation in the interacting time section, resulting in reduction of power consumption. Generally, a predetermined time is consumed to switch on or off the Tx/Rx circuit, so that it may be preferable that the circuit be successively turned off during a long period of time so as to effectively reduce power consumption. In order to facilitate power consumption reduction, a series of contention sections may first be arranged, and a data Tx/Rx section corresponding to each contention section may be arranged after the arranged contention sections and then managed.

Figure 8:
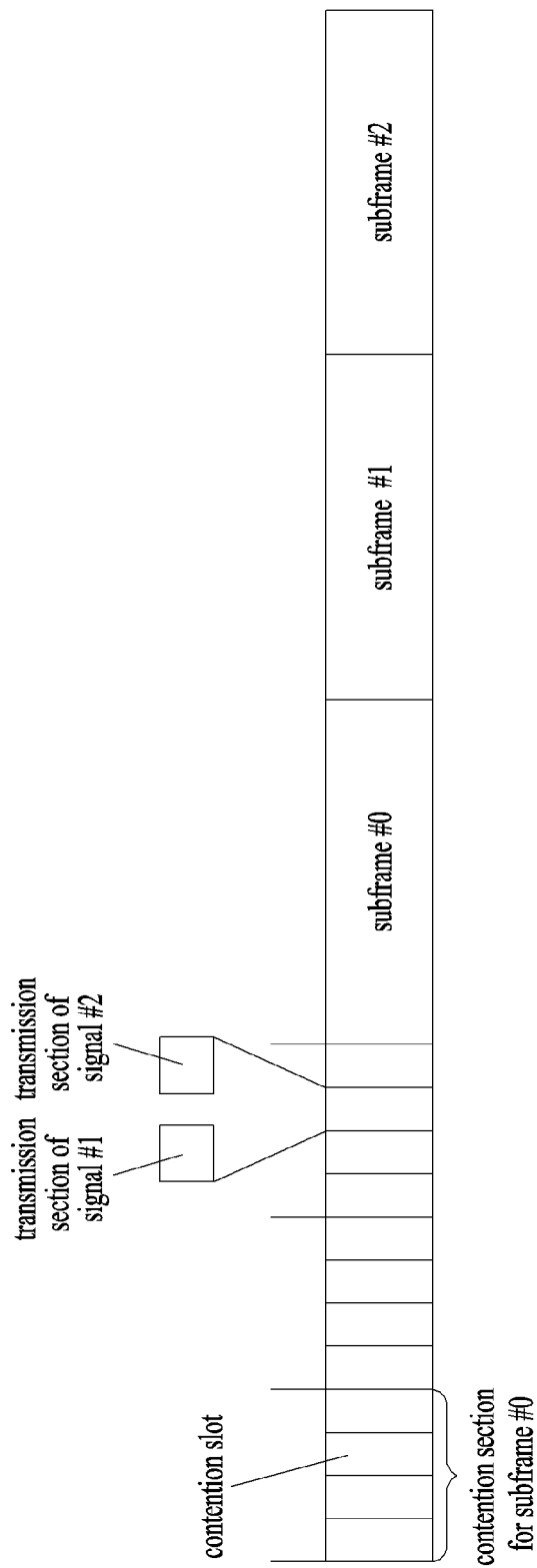
FIG. 8 illustrates an example of a contention section for D2D communication and data Tx/Rx sections according to an embodiment of the present invention.

FIG. 8 illustrates an example of a contention section for D2D communication and data Tx/Rx sections according to an embodiment of the present invention. Specifically, as can be seen from FIG. 8, it is assumed that three contention sections and three Tx/Rx sections are present, and each contention section is composed of four contention slots. For convenience of description and better understanding of the present invention, a unit time section in which D2D data is transmitted and received will hereinafter be referred to as a subframe, and a time unit including a series of contention sections and subframes connected to the contention sections will hereinafter be referred to as a frame. In FIG. 8, although each of the signal #1 and the signal #2 is transmitted only once, the above-mentioned operation is merely an example, and each of the signal #1 and the signal #2 may be repeatedly transmitted at least two times so as to sufficiently guarantee the Tx regions of the signal #1 and the signal #2. In this case, the position of iterative transmission time and/or frequency may be determined according to a predetermined rule on the basis of the initial transmission position.

In order to allow a plurality of UEs to simultaneously use the frame structure of FIG. 8, it may be preferable that the corresponding UEs be time-synchronized with each other. If UEs are present in the eNB coverage, the UEs may be synchronized with the eNB signal. If UEs are located outside the eNB coverage, a specific UE is selected at random, so that a reference signal for frame synchronization may be transmitted. Besides, although UEs are located outside the eNB coverage, if all UEs can obtain time synchronization through a satellite or if all UEs can obtain the eNB synchronization signal through the satellite, synchronization may be achieved through this signal or the position of the subframe or the contention slot may be recognized as a predetermined time.

As can be seen from FIG. 8, assuming that a specific UE transmits the signal #1 within the contention section #n and receives the signal #2 acting as a response to the signal #1, the subframe #n may be allocated for D2D data transmission of the UE.

Referring to FIG. 8, when several contention sections are present, assuming that the subframe successfully connected in the preceding contention section is occupied by a specific D2D link, the probability to be used when the corresponding link participates in contention within the lagging contention section is reduced (i.e., the transmission probability of the signal #1 is reduced), resulting in improvement of overall system throughput. For example, assuming that UE1 transmits the signal #1 and UE2 transmits the signal #2 acting as a response to the signal #1 within the contention section #n, the probability that UE1 transmits the signal #1 in the contention section #n+1 can be reduced. Extremely, UE1 may set the transmission probability of the signal #1 to zero (0) within the contention section #n+1. Alternatively, it may be possible to use the probability that is less than a value used in the contention section #n whereas it is greater than zero. As described above, the transmission probability of the signal #1 of the link having occupied the resource in a previous contention section is reduced in the next contention section, and the case in which a specific UE occupies a plurality of D2D subframes can be prevented from occurring.

In the meantime, in the case in which one D2D link receives the subframe through one contention section and stochastically performs transmission of the signal #1 even in the next contention section, there is no probability that the corresponding D2D link transmits the signal #1 in the corresponding contention section. Specifically, assuming that the probability that the UE having received the specific subframe transmits the signal #1 is reduced, the probability that the corresponding D2D link transmits the signal #1 may be more rapidly deteriorated. Assuming that data to be used by other UEs is not present, resources corresponding to the corresponding contention section are not occupied by the UEs, resulting in unnecessary consumption of such resources. Specifically, such resource consumption may frequently occur in the case in which D2D data intensively arrives at a specific UE. That is, in the case in which a large amount of data intensively arrives only at a specific UE at a specific time, it may be preferable that one D2D link continuously uses a plurality of subframes.

In order to implement more efficient operations under the above-mentioned environment, assuming that resources are not allocated to a specific contention section during a predetermined time, the D2D link automatically allocated from the previous contention section may be additionally used according to the present invention.

As one method for implementing the above-mentioned operations, under the situation in which UE1 transmits the signal #1 in the contention section #n and UE2 transmits the signal #2 as a response to the signal #1 in the contention section #n, assuming that UE1 does not detect the signal #1 transmitted from another UE or does not detect the signal #2 as a response to the transmission signal of another UE before the last contention slot within the contention section #n+1, UE1 always transmits the signal #1 in the last contention slot, such that the UE1 may attempt to transmit its own D2D data. Generally, assuming that UE1 transmits the signal #1 in the contention section #n and UE2 transmits the signal #2 as a response to the signal #1 in the contention section #n, UE1 may stochastically transmit the signal #1 in some of the last contention slots of the corresponding contention section. In this case, the transmission probability in the last some contention slots may be higher than that of the previous contention slot.

Of course, only when UE1 transmits the signal #1 and UE2 transmits the signal #2 as a response to the signal #1 such that the signal #2 is successfully received by the UE1, resources may be completely allocated to the subframe #n+1. Assuming that UE1 can process its own data only using the subframe #n, the process for transmitting the signal #1 in the last contention slot of the contention section #n+1 may be omitted as necessary.

Figure 9:
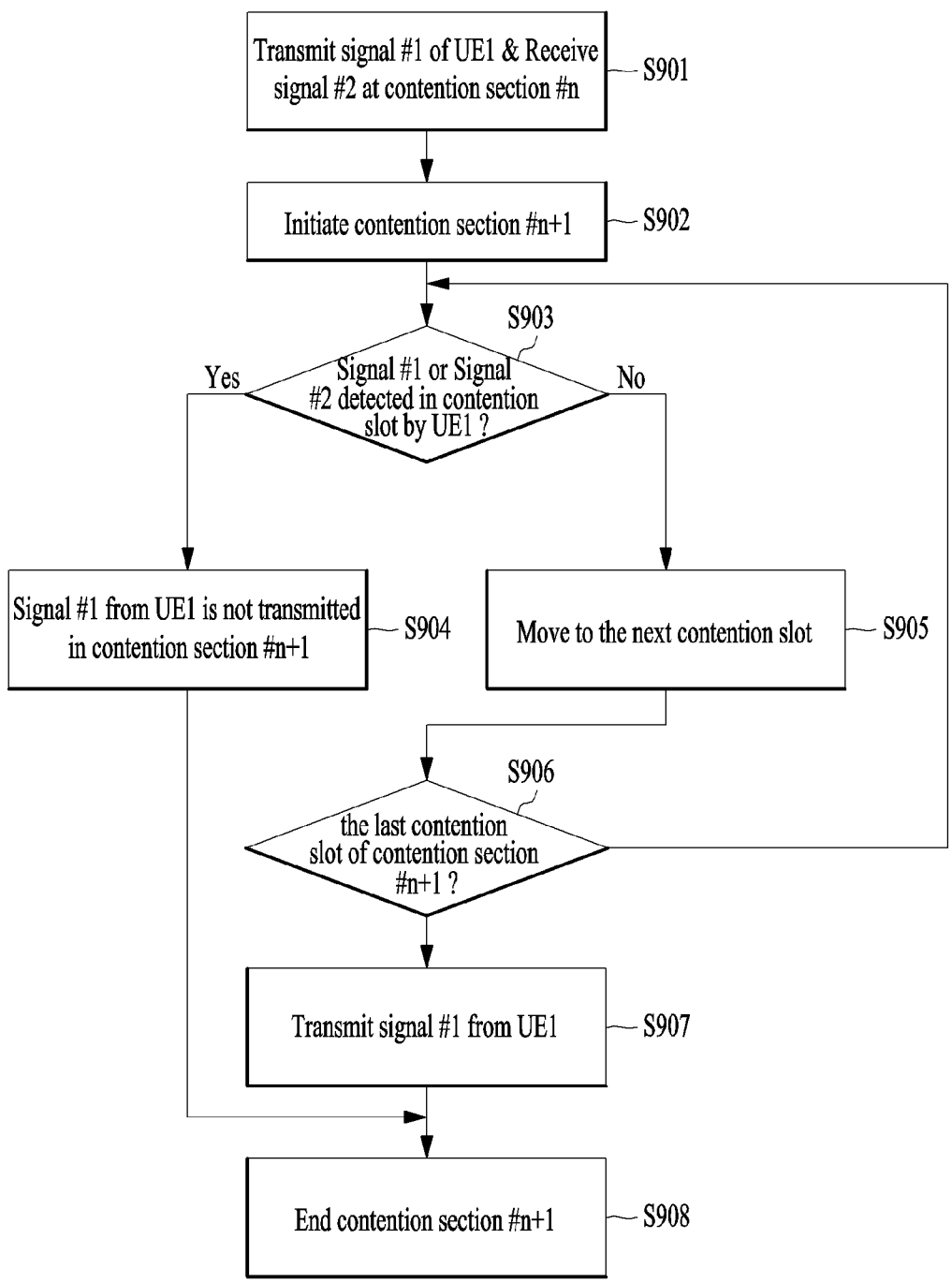
FIG. 9 is a flowchart illustrating a contention process according to an embodiment of the present invention.

FIG. 9 is a flowchart illustrating a contention process according to an embodiment of the present invention.

Referring to FIG. 9, UE1 may transmit the signal #1 and receives the signal #2 in the contention section #n in step 901. That is, D2D resources (i.e., subframe #n) corresponding to the contention section #n may be occupied by the UE1. The contention section #n+1 for occupying the subframe #n+1 corresponding to the next contention section may be initiated in step 902.

Subsequently, UE1 may determine whether the signal #1 or the signal #2 is detected in any one of the contention slots of the contention section #n+1 in step 903. If the signal #1 or the signal #2 is detected in step 903, it is determined that the signal #1 is not transmitted from the UE1 in the contention section #n+1 in step 904, and the contention section #n+1 may be completed in step 908.

In contrast, assuming that UE1 does not detect the signal #1 or the signal #2 in any one of the contention slots of the contention section #n+1 in step 903, the UE1 moves to the next contention slot in step 905, and determines whether the corresponding contention slot is the last contention slot of the contention section #n+1 in step 906.

If the corresponding contention slot is not identical to the last contention slot of the contention section #n+1, UE1 may determine whether the signal #1 or the signal #2 is detected in the moved contention slot in step 903. However, assuming that the corresponding contention slot is the last contention slot of the contention section #n+1, UE1 may transmit the signal #1 in step 907, and then complete the contention section #n+1 in step 908.

Although information indicating whether another UE receives the subframe #n+1 may be discriminated by detection of the signal #1 or by detection of the signal #2, the condition may be limited only to the case in which the signal #1 is detected or only to the other case in which the signal #1 is detected. Specifically, assuming that the above decision is determined by specific information indicating whether the signal #2 is detected, if UE1 receives the signal #1 of another UE and does not receive the signal #2 corresponding to the signal #1, it may be assumed that the subframe #n+1 is not allocated to another UE. In this case, since several UEs simultaneously transmit the signal #1, unexpected collision may occur, such that the signal #2 is not transmitted and it can be recognized that the subframe #n is not allocated to a certain UE. However, if a UE located at a remote site transmits the signal #2, the UE may not recognize transmission of the signal #2.

In the meantime, assuming that one contention section is achieved for allocation of only one subframe as shown in FIG. 8, overhead of the contention section may dramatically increase. In order to address this issue, a plurality of predetermined subframes may be allocated through only one contention section. For example, assuming that N contention sections are present and N*K subframes are present, K subframes may be allocated to only one D2D link through one contention section. In more detail, assuming that a specific UE transmits the signal #1 in the contention section #n and receives the signal #2 as a response to the signal #2, the corresponding UE may receive K successive subframes corresponding to subframes (#n*K, #n*K+1, #n*K+2, . . . , #n*K+K−1). In addition, assuming that a specific UE transmits the signal #1 in the contention section #n and receives the signal #2 as a response to the signal #1, the corresponding UE may also receive K subframes (#n, #N+n, #2*N+n, . . . , #(K−1)*N+n) spaced apart from one another by a predetermined spacing (N). Besides, a series of subframes may also be allocated according to various predetermined shapes. Through the above-mentioned process, the number of contention sections needed to allocate a predetermined number of subframes may be reduced.

A method for allocating a plurality of subframes through the above-mentioned one contention section can be efficiently utilized to allocate resources needed to transmit HARQ ACK regarding D2D data transmission within a specific subframe. That is, assuming that UE1 transmits data to UE2 in a specific subframe, UE2 may transmit HARQ ACK to UE1 within another subframe allocated along with the corresponding subframe. That is, assuming that a series of subframes is allocated through one contention section, two UEs of a D2D link having received the corresponding subframe may alternately perform data transmission and data reception.

Figure 10:
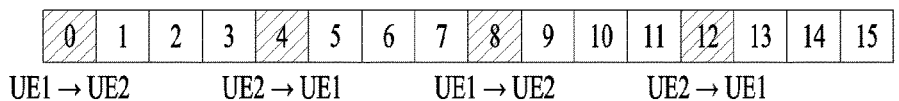
FIG. 10 illustrates one example of transmission (Tx) resources allocated to a D2D link according to an embodiment of the present invention.

FIG. 10 illustrates one example of transmission (Tx) resources allocated to a D2D link according to an embodiment of the present invention. Specifically, FIG. 10 may assume one case in which 16 subframes are allocated through 4 contention sections, and FIG. 10 may also assume the other case in which subframes (#n, #n+4, #n+8, #n+12) are allocated through the contention section #n. In addition, for convenience of description and better understanding of the present invention, the part corresponding to the contention section may be omitted from FIG. 10.

FIG. 10 illustrates an exemplary case in which UE1 transmits the signal #1 in the contention section #0 and UE2 transmits the signal #2. According to the above-mentioned principles, UE1 may transmit data to UE2 in the first subframe (Subframe #0), and UE1 may transmit HARQ ACK to UE1 in the next subframe (Subframe #4). The HARQ ACK may be transmitted along with data transmitted from UE1 to UE1. By repetition of the same operation, UE1 may transmit data in the subframe #8, and UE2 may transmit data in the subframe #12.

Figure 11:
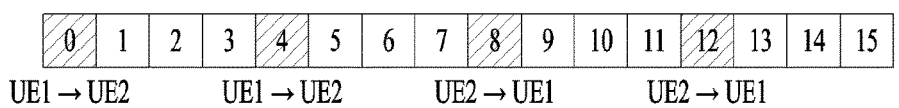
FIG. 11 illustrates another example of transmission (Tx) resources allocated to a D2D link according to an embodiment of the present invention.

FIG. 11 illustrates another example of transmission (Tx) resources allocated to a D2D link according to an embodiment of the present invention. FIG. 11 is a modification example of FIG. 10. In FIG. 11, subframes allocated to one D2D link may have the same position, but a communication direction is not inverted per subframe as shown in FIG. 10, and one direction of the preceding half subframe may be used to transmit signals. For example, when UE1 transmits data or signals to UE2, the preceding half subframe may be used. In contrast, the direction of the lagging half subframe is inverted so that the opposite direction may be used when UE2 transmits data or signals to UE1.

In this case, the n-th subframes in individual Tx directions may be interoperable with each other, such the n-th subframes may be used for HARQ ACK transmission. As can be seen from FIG. 11, HARQ ACK regarding the subframe #0 is transmitted at the subframe #8, HARQ ACK regarding the subframe #4 is transmitted at the subframe #12.

In accordance with the above-mentioned scheme, data transmission is primarily allowed for UE1 configured to initiate contention through transmission of the signal #1, such that there is a high probability that one UE having a large amount of data to be transmitted or the other UE having a long time delay will initiate such contention. As a result, resources are primarily allocated to such UEs so as to reduce a time delay.

Alternatively, in order to freely adjust the communication direction according to a situation, it may be possible to include a signal for designating a communication direction of the next subframe to be automatically allocated during transmission dedicated for each subframe. Alternatively, it may also be possible to include a specific signal for indicating a communication direction in the subsequent subframe to be automatically allocated during transmission of the initial subframe.

Figure 12:
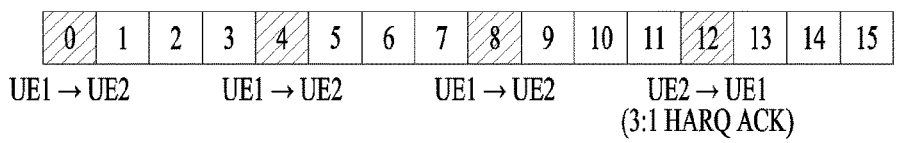
FIG. 12 illustrates another example of transmission (Tx) resources allocated to a D2D link according to an embodiment of the present invention.

FIG. 12 illustrates another example of transmission (Tx) resources allocated to a D2D link according to an embodiment of the present invention. Specifically, FIG. 12 is a modification example of FIGS. 10 and 11. In FIG. 12, the communication direction is changed only in the last subframe from among a plurality of subframes allocated to a specific D2D link, such that HARQ ACK can be transmitted in the changed communication direction.

As can be seen from FIG. 12, UE1 may transmit data using the subframes (#0, #4, #8), and UE2 may transmit the HARQ ACK using the subframe #12. In this case, UE2 may also transmit the HARQ ACK regarding data transmitted in three previous subframes through the subframe #12, such that it can be recognized that the ratio of a data subframe to HARQ ACK subframes is 3:1.

Generally, assuming that one UE transmits data through M first subframes to the subframe automatically allocated in one subframe, the Tx/Rx directions are inverted through the last subframe, such that the M:1 subframe allocation structure through which HARQ ACK is transmitted is achieved. The M value may be predetermined or may be indicated by the eNB through higher layer signaling or the like. Alternatively, the M value may be determined at a specific time at which the UE having received resources transmits data, such that the UE may be notified of the resultant M value.

The subframe in which the communication direction is inverted as shown in FIG. 12, for example, the subframe #12, may be used to transmit the HARQ ACK. In this case, the number of OFDM symbols occupied by the corresponding subframe or the size of frequency resources may be reduced.

Figure 13:
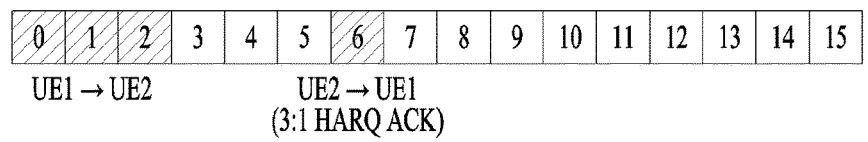
FIG. 13 illustrates another example of transmission (Tx) resources allocated to a D2D link according to an embodiment of the present invention.

FIG. 13 illustrates another example of transmission (Tx) resources allocated to a D2D link according to an embodiment of the present invention. Specifically, as can be seen from FIG. 13, it is assumed that the M:1 structure of FIG. 12 is used, M successive subframes are used in only one direction, and M is set to 3 (i.e., M=3).

In FIG. 13, it is assumed that a communication direction is inverted at the subframe #6 at which a predetermined data decoding time elapses from the subframe #2 corresponding to the last transmission from among three successive transmission actions. In this case, a predetermined time corresponding to three subframes is needed for data decoding.

Figure 14:
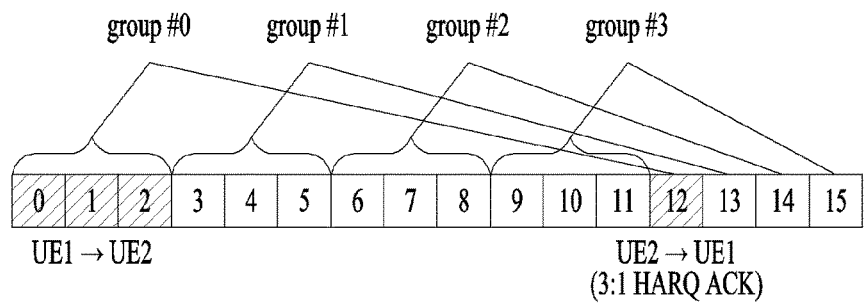
FIG. 14 is a conceptual diagram illustrating transmission (Tx) resources grouped and allocated to a D2D link according to an embodiment of the present invention.

FIG. 14 is a conceptual diagram illustrating transmission (Tx) resources grouped and allocated to a D2D link according to an embodiment of the present invention. Specifically, as can be seen from FIG. 14, subframes present in one frame are grouped into G groups each having (M+1) subframes, M successive subframes are allocated to one D2D link at the start point of the frame, and G subframes of the frame are then sequentially allocated to the group one by one, such that a communication direction is inverted. FIG. 14 shows an example in which 16 subframes are grouped into 4 groups.

In FIG. 14, subframes (#0, #1, #2) are used for transmission of UE1, and the subframe #12 may be used for transmission of UE2. Generally, one UE of a single link may use the subframes (#n*M, #n*M+1, . . . , #n*M+M−1) (where n=0, 1, . . . , G−1), and HARQ ACK associated with the subframes (#n*M, #n*M+1, . . . , #n*M+M−1) may be transmitted at the subframe (#M*G+n). In this case, the number of groups may be identical to the number of contention sections. In this case, the D2D link in which the signal #1 and the signal #2 have been successfully exchanged with each other in each contention section may use the corresponding group.

In the same manner as in FIG. 13, the subframe (for example, the subframe #6 of FIG. 13 or the subframe #12 of FIG. 14) in which the communication direction is inverted may be used only to transmit the HARQ ACK. In this case, the number of OFDM symbol occupied by the corresponding subframe may be reduced, or the size of a frequency resource occupied by the corresponding subframe may be reduced.

A method for adjusting the signal transmission probability when each UE stochastically transmits the signal at a specific time will hereinafter be given. Although the above-mentioned description has exemplarily disclosed that UE transmits the signal #1 in the contention section according to the frame structure of FIG. 8, the scope of application of the principles of the probability adjusting method to be described later is not limited thereto, and the principles of the probability adjusting method can be applied to the signal transmission and channel access method based on random probability.

Methods for stochastically transmitting the signal by the UE can be largely classified into two methods.

The first method may determine whether to transmit the signal at each contention slot on the basis of a predetermined probability. The first method will hereinafter be referred to as the probabilistic persistent signal transmission method. In more detail, the UE may have a specific signal transmission probability (p) at a specific time, and may transmit the signal at the corresponding slot using the probability (p), and may not transmit the signal using the probability (1−p). For example, the UE may generate random numbers from 0 to 1 in each contention slot. If the random number is less than the value of p, the UE may perform data transmission. The probability (p) may be adjusted according to the success or failure of previous signal transmission, and a maximum value and a minimum value may be given in such a manner that the probability (p) is present in a predetermined range. In the following description, the maximum value of the signal transmission probability (p) is denoted by $p_{max}$, and the minimum value thereof is denoted by $p_{min}$.

The second method may transmit signals using the contention counter, such that it transmits signals when the contention counter arrives at a predetermined number. The second method will hereinafter be referred to as a random backoff signal transmission scheme. The UE may generate random numbers of a predetermined range when a signal to be transmitted occurs. After the contention counter is initialized to this value, the contention counter is reduced to a predetermined value in each slot in which a channel is idle. Thereafter, if the contention counter reaches zero (0), the UE may transmit signals. If the range of random numbers configured to initialize the contention counter is limited to integers from 1 to C, the transmission probability of each contention slot is about 1/C. In this case, the parameter C for deciding the range of an initial value of the contention counter may be limited to a predetermined range. The maximum value of the parameter C may be denoted by $C_{max}$, and the minimum value thereof may be denoted by $C_{min}$. In this case, the parameter C may be referred to as a backoff window.

Generally, it may be preferable that various parameters needed for stochastic signal transmission be adjusted according to the number of UEs contending for signal transmission. Under the environment in which a small number of UEs are contending, each UE transmits signals at higher probability, such that it can prevent a specific contention slot from being unnecessarily consumed due to the presence of all UEs configured to transmit no signals. In other words, if a large number of UEs are contending, each UE transmits signals at lower probability, such that it can prevent collision of signals being simultaneously transmitted from at least two UEs. In this case, various parameters for stochastic signal transmission may include the transmission probability (p) in each contention slot according to the probabilistic persistent signal transmission scheme; and/or a maximum value ($p_{max}$) and a minimum value ($p_{min}$) corresponding to the transmission probability (p). In accordance with the random backoff signal transmission scheme, a maximum value ($C_{max}$) of the backoff window and the minimum value ($C_{min}$) thereof may be used.

As described above, as the number of contending UEs is reduced, it may be preferable that the transmission probability (p), and the maximum value ($p_{max}$) and the minimum value ($p_{min}$) be increased, and it may also be preferable that the maximum value ($C_{max}$) and the minimum value ($C_{min}$) of the backoff window be reduced. In contrast, as the number of contending UEs is increased, it may be preferable that the transmission probability (p), the maximum value ($p_{max}$), and the minimum value ($p_{min}$) be reduced, and it may also be preferable that the maximum value ($C_{max}$) and the minimum value ($C_{min}$) of the backoff window be increased.

For example, in order to allow one UE to transmit signals in each contention slot on average, the transmission probability (p) in each slot may be set to an inverse of the number of UEs participating in contention. Alternatively, each of $p_{max}$ and $p_{min}$ may be set to a specific value obtained when an appropriate coefficient is multiplied by an inverse of the number of UEs participating in contention. According to the above-mentioned scheme, various parameters needed for signal transmission are adjusted according to the number of UEs participating in contention, such that stochastic channel access can be more effectively achieved.

As described above, in order to adjust various parameters for stochastic signal transmission, each UE must recognize how many UEs participate in contention. When D2D is performed, if the above-mentioned operation is carried out by an indication message received from the eNB or if a representative UE controls a group of UEs, the corresponding eNB or the representative UE can estimate the number of UEs contending in a contiguous region (or an adjacent region). Instead of indicating the number of contention UEs, such signal transmission may be performed when various parameters of stochastic signal transmission to be used by each UE may be directly established.

In the meantime, when D2D operates without receiving an indication message from the eNB or the representative UE, or although the D2D operates upon receiving the indication message from the eNB or the representative UE, the eNB or the representative UE may have difficulty in recognizing the number of contention UEs for various reasons. In this case, each UE may autonomously recognize the number of contention UEs located in the vicinity of the UE, such that the UE may adjust various parameters needed for stochastic signal transmission. Specifically, prior to transmission and reception of D2D data, each UE may perform a series of processes for determining the presence or absence of a UE to be used as a transmission and reception object in a D2D communication available region of the UE. This process will hereinafter be referred to as a UE discovery procedure.

Generally, during the UE discovery procedure, each UE may transmit a discovery signal for UE identification. If a specific UE determines that this discovery signal has a predetermined quality or higher, it is determined that the corresponding UE is located in an available region of D2D data transmission and reception. Through this discovery process, the UE attempts to perform unnecessary D2D data communication with another UE not neighboring with the UE, such that the number of cases in which power consumption occurs and interference is applied to other UEs can be reduced. As all UEs are configured to perform the UE discovery procedure prior to transmission and reception of D2D data, each UE can estimate the number of contiguous (or neighbor) UEs contending with the UE through the above UE discovery procedure. Therefore, the present invention proposes a method for allowing each UE to estimate the number of contending UEs using the UE discovery procedure in such a manner that various parameters for stochastic signal transmission can be adjusted.

The following description will disclose detailed examples of the method for allowing each UE to estimate the number of contending UEs using the UE discovery procedure. The discovery signals transmitted from different UEs may be designed to maintain orthogonality therebetween in such a manner that interference between the discovery signals can be prevented from occurring.

Figure 15:
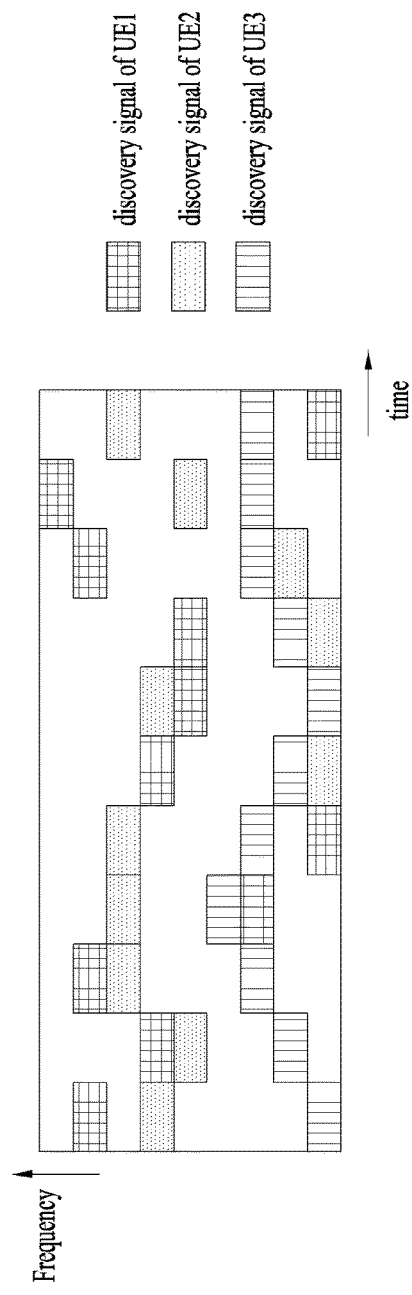
FIG. 15 illustrates a multiplexed example of a discovery signal transmitted from a plurality of UEs on predetermined time/frequency resources.

FIG. 15 illustrates a multiplexed example of a discovery signal transmitted from a plurality of UEs on predetermined time/frequency resources. It is assumed that the discovery signals of respective UEs occupy different frequency resources at a specific time and the positions of the frequency resources are changed over time. Of course, if there are a large number of UEs, all UEs may have difficulty in using resources needed for orthogonality maintenance. As a result, although discovery signals of different UEs overlap in some resources, the discovery signals are not overlapped in the sufficient amount of resources, such that the discovery signals of different UEs can be separated from each other at a high probability.

Although not shown in FIG. 15, the discovery signals of different UEs may apply different signatures to the same time/frequency resources, such that the discovery signals can be uniquely identified. In this case, the index of the signature for identifying the UE signal may be regarded as another discovery signal resource. As an example of the different signatures, the different signatures may be CDM-processed using the spreading code in different ways, or a unique signature obtained when different cyclic shifts (CPs) are applied to a specific pseudo random sequence may be transmitted.

Prior to execution of the discovery procedure, each UE must recognize the position of resources defined to transmit the discovery signal, and must also recognize how the corresponding resources can be divided into the discovery signal of each UE.

For example, after the discovery subframe is defined at a specific time, and the resources defined in a single discovery subframe are divided into T regions (each T region will hereinafter be referred to as a discovery partition) at the specific time, it is assumed that one UE transmits the discovery signal using only one discovery partition. Assuming that different discovery signals are transmitted using resources in which orthogonality is maintained, the discovery partitions do not overlap. Otherwise, some partitions may overlap in some resources. As can be seen from FIG. 15, three discovery partitions may be used by three UEs (UE1, UE2, UE3), and the remaining partitions are not used.

Each UE can determine whether the discovery signal is transmitted to each of T discovery partitions within one discovery subframe, and can recognize the number of UEs having transmitted signals in the corresponding discovery subframe on the basis of the determined information. For example, assuming that the discovery signal is detected from a total of t discovery partitions, it can be determined that t UEs have transmitted signals in the corresponding discovery subframe.

In this case, the UE may recognize that the operation for decoding each discovery signal in each discovery partition is excessively complicated, and the UE can determine whether the discovery signal is transmitted on the basis of energy of the reception signal observed in each discovery partition. For example, if the average value of the received energy in a specific discovery partition is equal to or higher than a predetermined value, it is determined that the corresponding partition is used to transmit the discovery signal of a specific UE. In order to determine whether the discovery signal based on such energy detection is transmitted, the corresponding resource may be used to transmit and receive only the discovery signal, and it may be preferable that the other signal energies are prevented from being mixed. Specifically, the corresponding resources may be empty in the contiguous cell (or the neighbor cell).

In the meantime, all UEs may not transmit the discovery signal in one discovery subframe. For example, if many UEs are present, it may be difficult for the discovery signals of all UEs to be transmitted in one discovery subframe. In this case, a plurality of discovery subframes may be defined, and only some UEs may be configured to transmit the discovery signal in each discovery subframe.

In addition, due to interference caused by signals transmitted from each UE, each UE may have difficulty in receiving the discovery signal at the corresponding time when the discovery signal is transmitted at a specific time. Therefore, each UE may transmit the discovery signal in only some of the predefined discovery subframes, such that the transmission discovery subframe pattern defining the transmission discovery subframe may be defined. For example, assuming that the transmission discovery subframe pattern is repeated at intervals of Q discovery subframes, the transmission discovery subframe pattern for one UE may be represented in the form of a bit stream composed of Q bits. If the q-th bit is set to 1, the discovery signal may be transmitted at the q-th discovery subframe. If the q-th bit is set to zero (0), the discovery signal may not be transmitted at the q-th discovery subframe.

Assuming that each UE transmits the discovery signal in R discovery subframes from among Q discovery subframes, i.e., assuming that 1 appears R times in the discovery subframe pattern of each UE, the number of UEs having transmitted the discovery signal may be estimated as follows.

First, the UE may observe Q discovery subframes, and may determine how many discovery partitions from among individual discovery subframes are associated with detection of discovery signal transmission. Here, the discovery subframe in which the UE directly transmits the discovery signal may be excluded from the above procedure. As a result, the average number of UEs configured to transmit the discovery signal in each discovery subframe may be calculated. In other words, the average number of discovery partitions in which energy having at least a predetermined energy level is detected can be calculated.

Assuming that this value is set to V, the number of contention UEs located in the vicinity of each UE on the basis of the measurement value V. For example, according to the above-mentioned assumption, it may be determined that the discovery signal is transmitted Q*V times during the Q discovery subframes, and each UE transmits the discovery signal R times during the Q discovery subframes, such that the number of UEs configured to transmit the discovery signal may be estimated to be Q*V/R. Assuming that the UE is contained in such estimation, the number of UEs configured to transmit the discovery signal may be denoted by Q*V/R+1. The UE may adjust various parameters for the above-mentioned stochastic signal transmission on the basis of such estimation values.

In the meantime, some UEs configured to transmit the discovery signal may not participate in contention for D2D data communication. For example, assuming that a specific UE has data to be transmitted through D2D communication and is contiguous to another UE associated with the specific UE, the discovery signal may be transmitted in such a manner that the corresponding UE can discover the UE itself and can conduct appropriate handling. Assuming that the number of UEs is estimated on the basis of energy of the discovery partition on the condition that such UEs are present, this estimation value may be higher than the number of UEs participating in contention for D2D data. In order to correct this portion, a coefficient from 0 to 1 is multiplied by the estimated number of UEs, such that the number of contention UEs may be calculated for transmission of D2D data. In this case, the above-mentioned coefficient may indicate the ratio of UEs attempting to transmit D2D data from among a total number of UEs. The coefficient may be predetermined, or may be transmitted from the eNB or the representative UE capable of recognizing how many UEs are distributed.

Alternatively, in order to estimate the number of UEs attempting to transmit D2D data, the UE attempting to transmit D2D data may transmit the discovery signal using separate discriminated resources. In this case, the UE may detect energy of the discovery partition using only resources through which only a UE attempting to transmit D2D data transmits data or signals, and the number of UEs may be estimated. Resources transmitted only by the UE in which D2D transmission is attempted may be classified into a specific discovery subframe, or may be uniquely identified using specific frequency resources and/or signatures.

In addition, the discovery signal resource for use in a UE attempting to transmit D2D data may be distinguished from the discovery signal resource for use in the other UE not attempting to transmit D2D data. However, after all UEs define the resources needed for transmission of the discovery signal according to the same principles, irrespective of transmission or non-transmission of D2D data, additional discovery signal resources may be defined, and only the UE attempting to transmit D2D data may additionally transmit the discovery signal using the additional discovery signal resources. For example, a series of discovery subframes may be additionally defined, and only the UE attempting to transmit D2D data may additionally transmit the discovery signal in the corresponding subframe. Specifically, if UEs attempting to transmit D2D data use additional discovery signal transmission resources, the corresponding UEs can more frequently transmit the discovery signal, such that some UEs having D2D data can be quickly discovered through the above operation and they can quickly enter the D2D data transmission/reception processes.

In the case of resource allocation operations using the contention slots shown in FIG. 8, the transmission part of the signal #2 may be omitted as necessary. Specifically, in the case of such omission of the transmission part of the signal #2, the UE attempting to transmit the signal #2 may be additionally selected when several UEs receive the signal #2, the selected UE can be appropriately used for a broadcast or groupcast communication scheme in which several UEs receive signals transmitted from one UE. In this case, the broadcast communication scheme may indicate that signals transmitted from one UE are received by all neighbor UEs, and the groupcast communication scheme may indicate that a series of UEs form a group and all UEs belonging to the same group receive signals transmitted from one UE.

Figure 16:
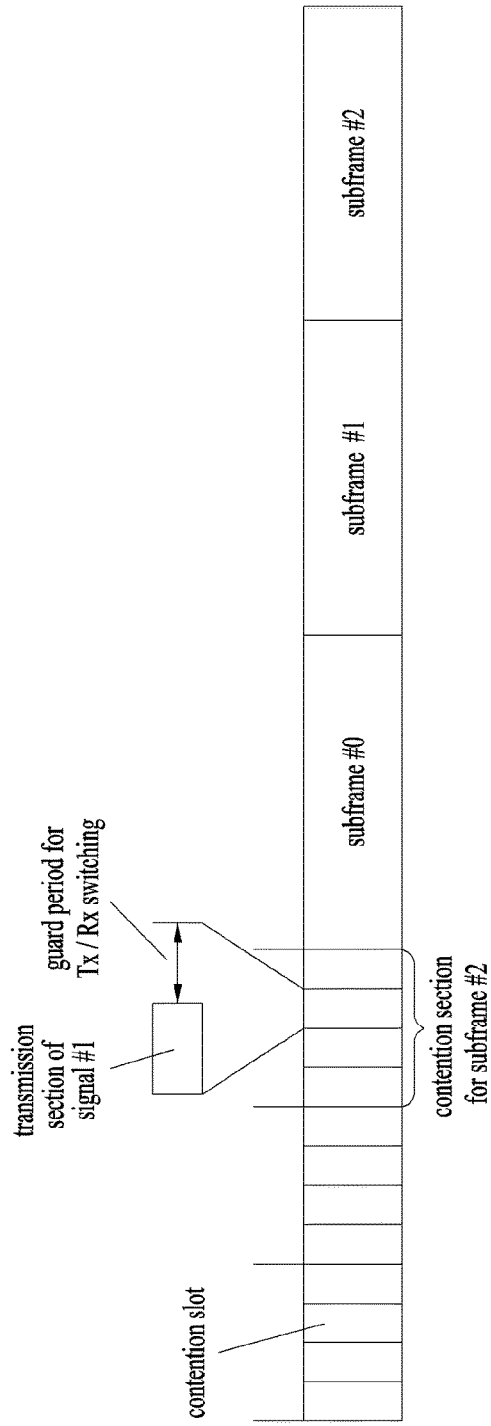
FIG. 16 illustrates another example of a contention section for D2D communication and data Tx/Rx sections according to an embodiment of the present invention.

FIG. 16 illustrates another example of a contention section for D2D communication and data Tx/Rx sections according to an embodiment of the present invention. Specifically, FIG. 16 shows a modified case in which the transmission part of the signal #2 is omitted. As can be seen from FIG. 16, one frame includes three subframes and a contention section corresponding to each subframe.

In this case, the UE having initially transmitted the signal #1 in a specific contention section may transmit the signal in the corresponding subframe. That is, if a first UE does not detect the signal #1 of a second UE prior to a transmission time of the signal #1 of the first UE within a specific contention section, or although the first UE detects the signal #1 of the second UE prior to the transmission time of the signal #1 of the first UE within the specific contention section, assuming that the reception quality of the signal #1 of the second UE is equal to or less than a predetermined level, this means that the transmission UE of the corresponding signal #1 occupies the corresponding subframe.

Alternatively, in order to maintain a common structure with other D2D communication, a time section for the signal #2 may be defined as shown in FIG. 8. In the case of special communication in which several UEs can receive data or signals as in the broadcast or groupcast communication scheme, it may be assumed that the signal #2 is always successfully received. In order to discriminate the above-mentioned operation, the signal #1 used to schedule such communication may be discriminated by the method configured to use a separate sequence. In addition, the signal #2 used for broadcast or groupcast may also be identified by the operation in which a separate sequence is used in advance. The UE having detected the signal #1 corresponding to the broadcast or groupcast communication scheme in which several UEs must receive signals or data may operate to prevent transmission of the signal #2, such that the corresponding signal #1 can be connected to correct subframe allocation.

However, even in the above-mentioned case, two or more UEs may simultaneously transmit the signal #1, such that D2D signal transmission actions of two UEs may collide with each other in the same subframe. In order to address this issue, the signal #2 may be transmitted according to a modified example. For example, the structure of FIG. 8 is maintained, and only the UE having detected at least two different signals #1 in the same contention slot can transmit the signal #2. Needless to say, when the signal #2 is transmitted from a UE located at a remote site, a predetermined condition in which a difference in signal magnitude between different signals #1 is equal to or less than a predetermined level may be added in such a manner that collision is not determined.

The UE having transmitted the signal #1 may determine that no collision occurs in the case in which the signal #2 is not detected, and may transmit the D2D signal in the corresponding subframe. If even one UE transmits the signal #2, this operation may be regarded as the occurrence of transmission collision of the signal #1 in the same resources. If the transmission collision of the signal #2 is discovered, transmission of the stochastic signal #1 may be re-attempted using the remaining contention slots.

In the meantime, a UE capable of detecting two or more signals #2 with respect to signals having different priorities in the same contention slot can be used. For example, in the same manner as in the broadcast or groupcast communication scheme, the signal #1 regarding the signal transmitted to a plurality of UEs and the signal #1 regarding the signal transmitted to each UE can be simultaneously detected. In this case, it is preferable that many more UEs allocate priority to the signal #1 regarding the signal transmitted to plural UEs. Similarly, if the signal #1 for broadcast communication is distinguished from the other signal #1 for groupcast communication, higher priority may be assigned to the broadcast communication in which all UEs must receive signals or data.

If priority is present between the signals #1 as described above, specifically, if higher priority is assigned to the signal received by several UEs, assuming that the signals #1 having different priorities are received in the same contention slot, the UEs may not transmit the signal #2. In the above-mentioned embodiment in which the signal #2 is not detected and this situation is regarded as successful transmission of the signal #1, the subframe may be primarily allocated to the D2D signal received by several UEs according to the above-mentioned operation.

Alternatively, although the signal #2 is detected from the viewpoint of the transmission UE, and this detected signal #2 corresponds to the D2D signal having lower priority than the signal #2 transmitted from the UE, detection of the signal #1 may be discarded, it is assumed that the corresponding subframe is allocated to the UE, such that the D2D signal can be transmitted on this assumption.

Figure 17:
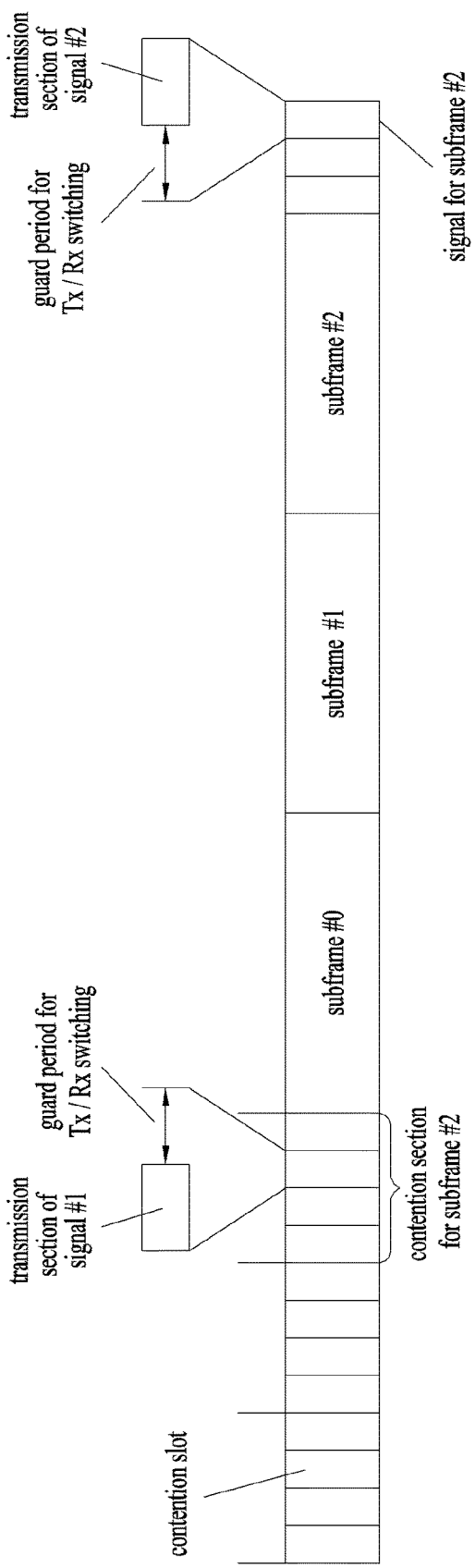
FIG. 17 illustrates another example of a contention section for D2D communication and data Tx/Rx sections according to an embodiment of the present invention.

FIG. 17 illustrates another example of a contention section for D2D communication and data Tx/Rx sections according to an embodiment of the present invention.

Referring to FIG. 17, although additional transmission of the signal #2 is not achieved in the contention slot, this means that a specific time for the signal #2 is located at the end of the subframe. In more detail, the UE having failed to receive the D2D signal in the corresponding subframe transmits the signal #2, such that a UE having transmitted the D2D signal can recognize whether all UEs located in the region have correctly received the signals, and the UE can recognize whether the same D2D signal needs to be retransmitted.

Although FIG. 17 assumes that the transmission section of the corresponding signals #2 appears after completion of a series of subframes, the transmission section of each signal #2 corresponding to the corresponding subframe may also begin at the end time of each subframe. In addition, the structure of FIG. 8 is combined with the structure of FIG. 17, and the transmission resource of the signal #2 remains even in the contention slot located before the subframe using characteristics of FIG. 8, such that the presence or absence of collision of the signal #1 may be determined in advance according to the above-mentioned embodiments. In addition, the frame structure can be formed in a manner that it can be determined whether D2D transmission in one subframe has been correctly transmitted to contiguous UEs using characteristics of FIG. 17.

Meanwhile, when individual subframes are used in data transmission/reception between UEs according to the above-mentioned scheme, the transmission/reception (Tx/Rx) operation between UEs may be limited in some time sections. Specifically, such limitation may be effectively used in the case in which some UEs participating in D2D Tx/Rx between UEs are located in the eNB coverage such that the some UEs can maintain communication with the eNB. Moreover, when some of the UEs may relay the D2D signals (especially, the D2D signal to be transmitted or received from the UE located outside the eNB coverage) to the eNB or when the D2D signal is received from the eNB, time resources used for communication between the corresponding relay UE and the eNB can be guaranteed.

Figure 18:
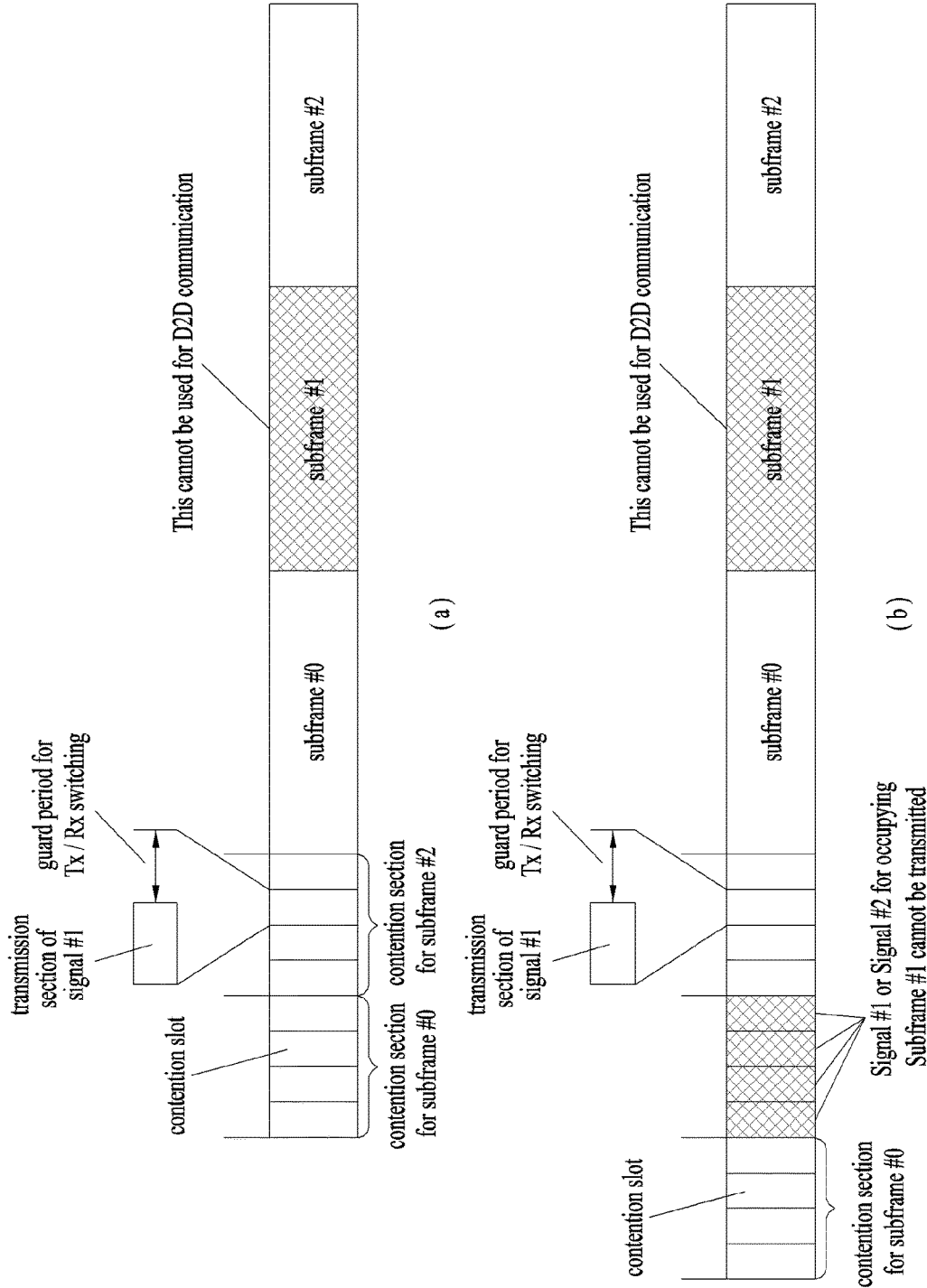
FIG. 18 illustrates one example of a contention section for D2D communication and data Tx/Rx sections when D2D communication is limited in a specific subframe according to an embodiment of the present invention.

FIG. 18 illustrates one example of a contention section for D2D communication and data Tx/Rx sections when the D2D communication is limited in a specific subframe according to an embodiment of the present invention. Specifically, FIG. 18 shows an exemplary case in which D2D transmission/reception (Tx/Rx) is limited in the subframe #1 from among three subframes shown in FIG. 16. For convenience of description and better understanding of the present invention, FIG. 18 assumes that the transmission section of the signal #2 is omitted.

First of all, the contention section corresponding to the subframe in which D2D transmission/reception is limited may be omitted as shown in FIG. 18(a), and the contention section is present in all subframes as shown in FIG. 18(b). However, UEs located outside the eNB communication coverage may operate to limit transmission of the signal #1 or the signal #2 with respect to the subframe in which D2D Tx/Rx is limited. As shown in FIG. 18(b), the UEs connected to the eNB may operate to perform D2D communication in the subframe in which D2D transmission/reception is limited upon receiving the indication message from the eNB.

For this operation, the eNB may inform UEs that D2D communication limitation occurs in a certain subframe. For UEs located outside the eNB coverage, some UEs (e.g., UEs configured to transmit a reference signal of time synchronization of this frame structure) may transmit position information regarding the D2D communication limitation to other UEs.

As shown in FIG. 18, assuming that a specific subframe cannot be used for D2D communication, there is no usage of the contention section corresponding to the specific subframe. In this case, a time section corresponding to the corresponding contention section may be used as a contention section for other subframes in which D2D communication can be used.

Figure 19:
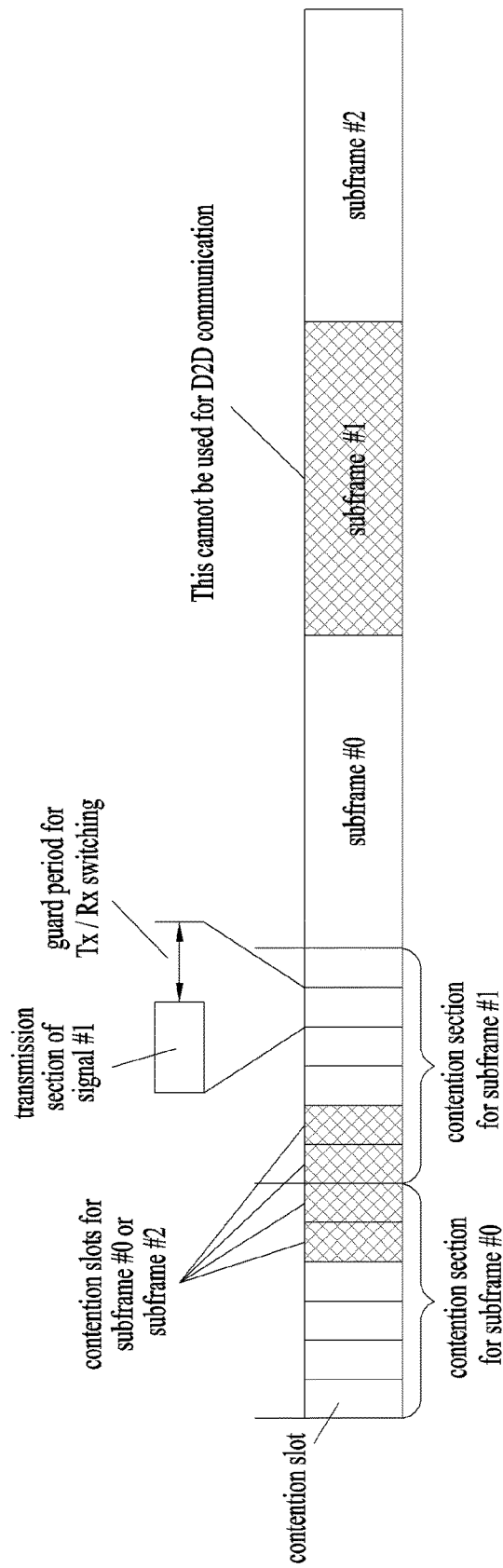
FIG. 19 illustrates another example of a contention section for D2D communication and data Tx/Rx sections when D2D communication is limited in a specific subframe according to an embodiment of the present invention.

FIG. 19 illustrates another example of a contention section for D2D communication and data Tx/Rx sections when the D2D communication is limited in a specific subframe according to an embodiment of the present invention. In FIG. 19, as the subframe #1 cannot be used for D2D communication under the same situation as in FIG. 16, the contention slots interacting with the subframe #1 may be used for D2D communication in the subframe #0 or the subframe #2 in which D2D communication is available.

In this case, a total number of contention slots is maintained under the situation in which the position or number of subframes in which D2D communication is available is changed in a single D2D frame, such that the overall D2D frame structure (for example, the length of a single D2D frame) can be uniquely managed. In addition, assuming that D2D communication is not available in some subframes, the number of contention slots regarding the subframe in which D2D communication is available is increased, such that the probability that several UEs can transmit the signal #1 to the same contention slot can be reduced.

Generally, when X contention slots and Y subframes are defined in one D2D frame, assuming that D2D communication is available in Z subframes, the number of contention slots interacting with one subframe in which D2D communication is available may be set to X/Z. If X/Z is not set to an integer, the number of contention slots may be a minimum integer equal to or less than the value of X/Z. In this case, the remaining contention slots may be distributed to subframes (in which D2D communication is possible) one by one, may be allocated to subframes in which the last D2D communication is possible, or may not be used in the subframes. Needless to say, assuming that W subframes from among Z subframes in which D2D communication is possible can be reserved through only one contention as described above, the above-mentioned calculation process can be carried out using the value of Z/W instead of using the value of Z.

Figure 20:
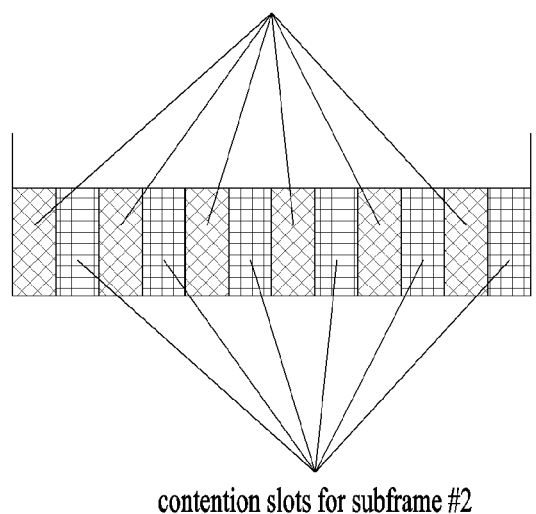
FIG. 20 illustrates that respective contention slots are sequentially interoperable with a subframe capable of communicating with D2D communication according to an embodiment of the present invention.

Alternatively, respective contention slots may be sequentially interoperable with the subframes in which D2D communication is possible. FIG. 20 illustrates that respective contention slots are sequentially interoperable with a subframe capable of communicating with D2D communication according to an embodiment of the present invention. In FIG. 20, it is assumed that D2D communication is impossible in the subframe #1 from among the subframes (#0, #1, #2).

Alternatively, D2D transmission/reception limitation may occur in units of a frame composed of plural contention sections and subframes. In order to distinguish the frame structures shown in FIGS. 8 to 18 from the legacy frame structures used in communication between the UE and the eNB, the frame structures shown in FIGS. 8 to 18 may be referred to as D2D frame structures, and the length of each D2D frame may be identical to or different from the length of a frame used in communication between the UE and the eNB.

Figure 21:
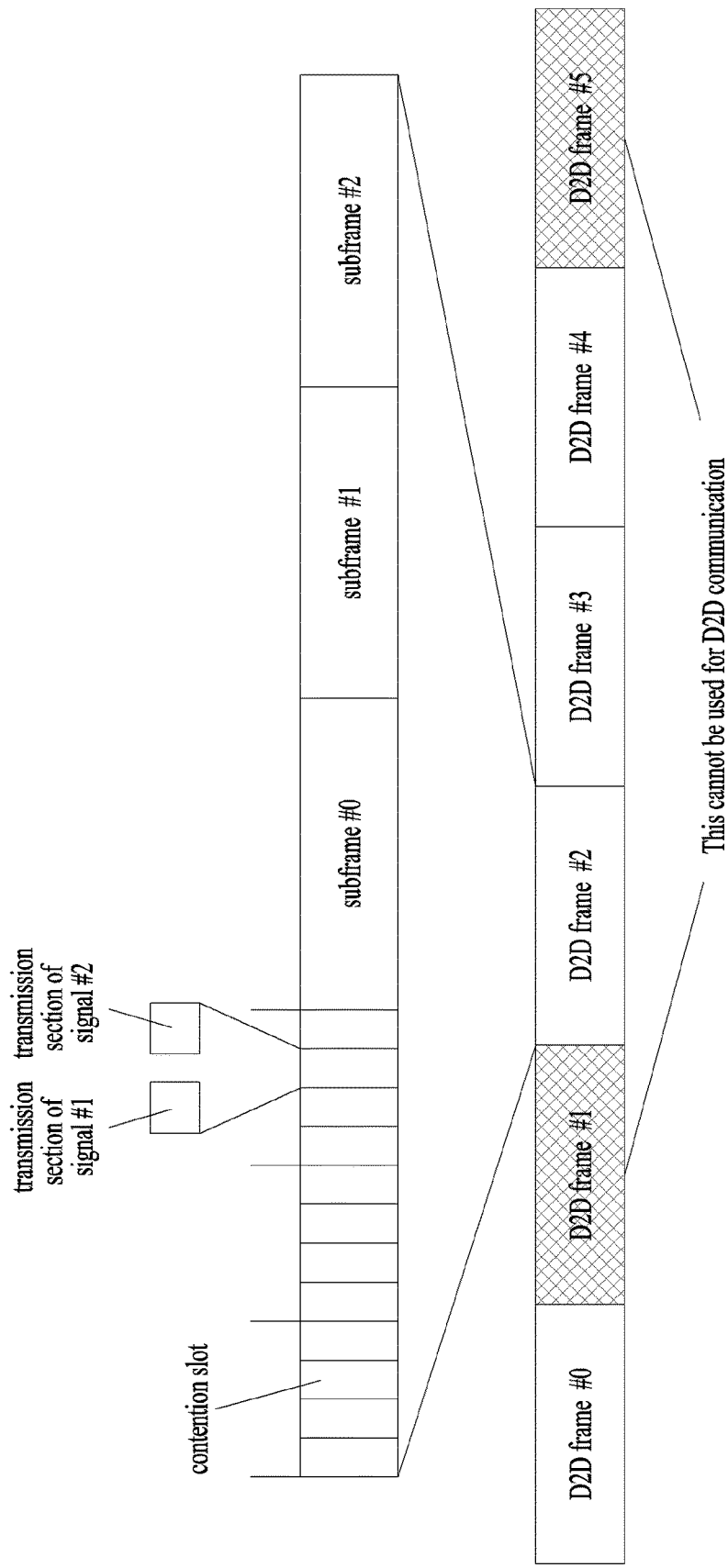
FIG. 21 exemplarily illustrates that restriction occurs in D2D communication in a D2D frame according to an embodiment of the present invention.

FIG. 21 exemplarily illustrates that restriction occurs in D2D communication in a D2D frame according to an embodiment of the present invention. Specifically, FIG. 21 illustrates an exemplary case in which D2D transmission/reception limitation occurs in each of the D2D frame #1 and the D2D frame #5 from among D2D frames having the same structure of FIG. 8. Likewise, the eNB and some UEs (e.g., UEs configured to transmit a reference signal of time synchronization of the frame structure) may transmit specific information indicating which D2D frame is associated with limitation of D2D transmission/reception to other UEs.

A method for performing resource allocation in a frequency domain according to the above-mentioned principles of the present invention will hereinafter be given in detail.

When a subframe in which a specific UE is scheduled to transmit signals is decided, assuming that the overall system bandwidth is very large and there is a small amount of frequency resources needed for transmission of the corresponding signal, the corresponding UE may transmit its own signal only using some frequency resources, and the remaining frequency resources may operate in a manner that other UEs can use the remaining frequency resources. Therefore, it is necessary for a UE attempting to transmit D2D data to use not only subframes to be used by the UE but also the frequency resources to be used by the UE. An exemplary case in which the UE transmits data using only one division under the situation in which an overall bandwidth is divided into a predetermined number of frequency domains will hereinafter be given in detail.

If the subframe to be used by the UE is basically determined, one of several frequency domains defined in the subframe may be stochastically selected. For example, in the subframe in which a specific UE decides to transmit signals through the Tx/Rx processes of the signal #1 and/or the signal #2, the frequency domain defined in the corresponding subframe may be selected at random, and the selected signals may be transmitted. The above-mentioned scheme is characterized in that resources can be properly distributed to UEs in terms of time, and frequency resource selection can be maximally simplified under the situation in which resource allocation between UEs is sufficiently achieved through the corresponding process.

Alternatively, the UE may operate to select resources (to be used by contiguous UEs) having a relatively low usage degree from among frequency resources contained in the subframe in which the UE is scheduled to transmit signals. For example, the UE may receive or measure the signal of the contiguous UE in each frequency resource within the subframe in which the UE attempts to transmit signals, or may select resources through which the smallest number of signals of the contiguous UE may be received. Alternatively, one of resources through which resources of less than a predetermined level are received can be selected at random. In this case, the signal of a contiguous UE may be a signal of a known sequence such as DM-RS used by the contiguous UE, or may be the signal formed by the sum of all signal components without distinction between signals.

In this case, assuming that the corresponding UE measures the signal of contiguous UEs in a specific subframe, the UE may not transmit its own signal at the corresponding time point. Therefore, this signal measurement time and the actual signal transmission resource time must be separated from each other in terms of time, and a predetermined relationship between the signal measurement time and the actual signal transmission resource time must be simultaneously present. That is, a signal transmission time must be defined in advance according to the measurement result of a specific time, such that the result obtained at the transmission resource time may be estimated on the basis of the measurement result of the signal measurement time.

In order to implement the above-mentioned method, each UE simultaneously receives a plurality of subframes as described above, and another UE specifies the signal of the corresponding UE in the former one from among the corresponding allocated subframes, such that it can be recognized which one of frequency resources of a certain subframe will be used to maintain transmission of the corresponding UE. Specifically, the contention section configured to transmit the signal #1 and/or the signal #2 may be used as the signal measurement resource. Assuming that each UE can recognize not only the subframe position corresponding to the signals (#1, #2) but also the position information of frequency resources through reception of the signal #1 and/or the signal #2, the signal of another UE is measured in the contention section, it can be predicted which frequency resource of a certain subframe will be associated with signal transmission of another UE at a predetermined level in the future.

If it is determined which frequency resource is allocated through the signal #1 and/or the signal #2, this operation will be helpful to selection of frequency resources of each UE. For this purpose, information regarding the frequency domain must be contained in the signal #1 or the signal #2, and the following methods may be used.

Method 1) The contention section is divided into a plurality of frequency domains, and a UE attempting to use a specific frequency domain may transmit the signal #1 in the same frequency domain. Likewise, the signal #2 may also be transmitted in the same frequency domain. Another UE can recognize the position of a subframe to be used by the corresponding UE on the basis of the fact indicating which contention slot is used for detection of the signal #1 or the signal #2. In addition, through the position of the frequency domain of the signal #1 or the signal #2, the position of the frequency resource to be used by the corresponding UE can also be recognized.

Generally, when a specific UE recognizes the position of a frequency resource to be used in transmission of the actual D2D data on the basis of the frequency position of the signal #1 or the signal #2, the frequency position of the contention section is different from the frequency position of a data subframe. However, the frequency position of the contention section may be mapped to the frequency position of the data subframe according to the predefined relationship. The relationship between the frequency position of the contention section and the frequency position of the data subframe may be denoted by 1:1, or may be the one-to-multiple relationship or may be the multiple-to-one relationship.

In this case, the one-to-multiple relationship may indicate that one frequency domain in the contention section is mapped to a plurality of frequency domains in the data subframe. If one UE transmits the signal #1 in a specific frequency domain, one of the mapped frequency domains is selected and D2D data is used in the selected frequency domain. Since several data subframe frequency domains are connected to the frequency domain in the contention section, resources can be allocated to the data subframe using a relatively small amount of contention section resources. In addition, the multiple-to-one relationship may indicate that several frequency domains of the contention section are mapped to one frequency domain of the data subframe.

Figure 22:
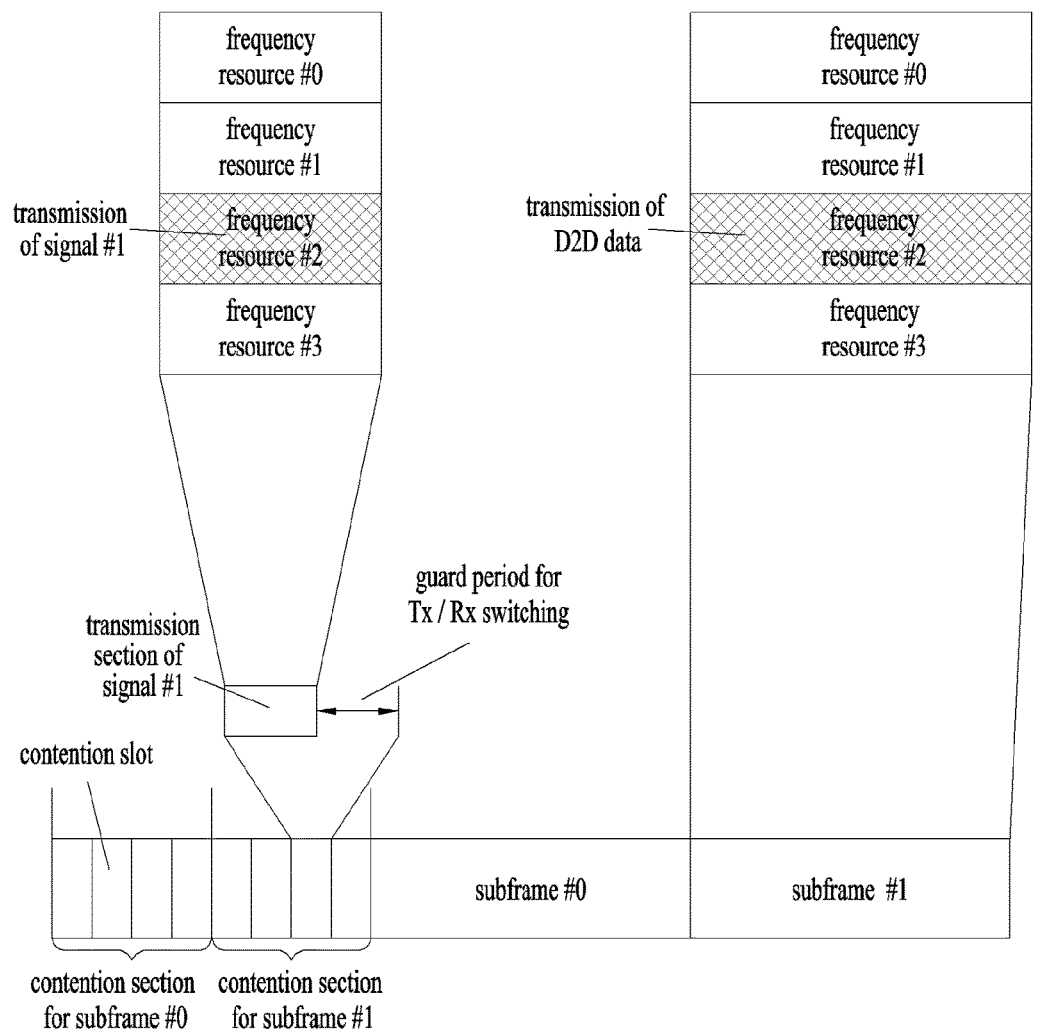
FIG. 22 illustrates one allocation example of a time resource and a frequency resource for use in a D2D frame according to an embodiment of the present invention.

FIG. 22 illustrates one allocation example of a time resource and a frequency resource for use in a D2D frame according to an embodiment of the present invention. Specifically, FIG. 22 illustrates an exemplary case in which a specific UE uses the frequency domain #2 during a predetermined time in which one subframe is divided into 4 frequency domains.

Although the one-to-one relationship is achieved, the position of a frequency domain in the contention section may be different from the position of a frequency domain in the data subframe. For example, in a series of data subframes allocated by one transmission of the signal #1, the position of the corresponding frequency domain may be changed per subframe according to a predetermined rule.

Method 2) Information regarding the frequency domain used by the corresponding UE may be contained in the signal #1 or #2 transmitted from the UE.

For example, each candidate of the parameters used when signals used as the signal #1 or #2 are generated may correspond to the position of a frequency domain, and the UE scheduled to use a specific frequency domain may use the signal #1 or #2 generated as parameters corresponding to the corresponding region. In this case, the subframe index may also be mapped to the corresponding parameter, and the corresponding UE may simultaneously recognize the subframe and frequency domain to be used by the corresponding UE through parameters of signals used in the signal #1 or #2.

In another example, a specific field in which information regarding the position index of the frequency domain is represented by a series of bits may be added to the signal #1 or the signal #2. If the specific field is added to the signal #1 or the signal #2, the subframe index may also be contained in the specific field. In this case, the signal #1 or the signal #2 regarding an arbitrary subframe may be transmitted in all contention slots.

FIG. 23 illustrates another allocation example of a time resource and a frequency resource for use in a D2D frame according to an embodiment of the present invention. Specifically, FIG. 23(a) illustrates that the position of a frequency domain is recognized through signal parameters, and FIG. 23(b) illustrates that the position of a frequency domain is recognized through the field contained in the signal. Referring to FIG. 23, the position of a frequency resource through which the signal #2 or the signal #2 is transmitted may be established at random. Preferably, in order to simplify the UE reception operation, the frequency resources may be fixed in the form of some RBs located at the center part of the system bandwidth.

Alternatively, the above-mentioned resource allocation schemes may be combined and used. For example, frequency resources of data transmission may be determined from the frequency resources through which the signal #1 or the signal #2 is transmitted according to the scheme of FIG. 22. According to the scheme of FIG. 23, time resources (e.g., the subframe position) needed for data transmission may be determined on the basis of the signal parameters or the bit field contained in the signal #1 or the signal #2.

The frequency resource allocation scheme based on the signal #1 or the signal #2 may also be applied to the method for adjusting a frequency bandwidth needed for data transmission of the UE. For example, when reservation of the corresponding resources is achieved by transmitting the signal #1 to the resource corresponding to the frequency resource to be used for data transmission as shown in FIG. 22, if the UE attempts to use a larger bandwidth for data transmission, the UE may transmit the signal #1 to all resources corresponding to the corresponding bandwidth. Assuming that the one-to-one relationship between the signal #1 and the data resource is achieved, the UE attempting to use a larger bandwidth as data must transmit the signal #1 in the larger bandwidth.

Figure 24:
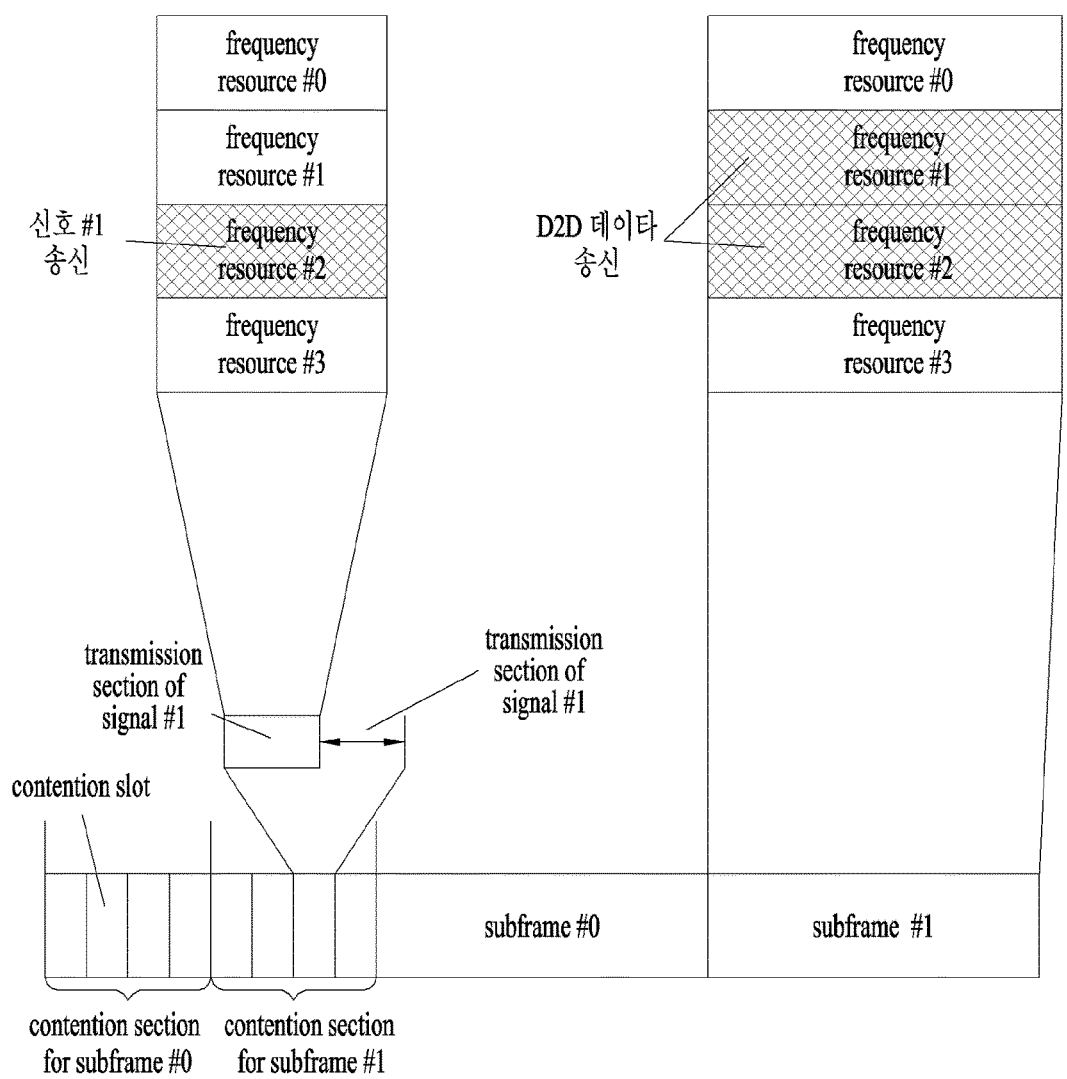
FIG. 24 illustrates another allocation example of a time resource and a frequency resource for use in a D2D frame according to an embodiment of the present invention.

FIG. 24 illustrates another allocation example of a time resource and a frequency resource for use in a D2D frame according to an embodiment of the present invention. Specifically, FIG. 24 illustrates an exemplary case in which the frequency resource #1 and the frequency resource #2 are simultaneously used under the same structure as in FIG. 22.

As described above, the operation for extending the transmission bandwidth of the signal #1 may be implemented by repeating the signal #1 of the unit frequency resource in each frequency resource. Alternatively, the above-mentioned operation may also be implemented by transmitting a single signal throughout the overall transmission frequency domain. Specifically, in the latter case, the sequence of the signal #1 used according to the transmission bandwidth of the signal #1 is established in different ways, and it can be prevented that the reception UE detects only signals of some bands of the signal #1 and misjudges the transmission bandwidth of the lagging data. For example, parameters used for formation of the signal #1 are divided into a plurality of parameter groups, and one parameter group may interact with the transmission bandwidth (i.e., one transmission bandwidth value of D2D data) of the signal #1.

In this case, the reception UE must attempt to detect the frequency resources (e.g., the set of RBs) needed for transmission of the signal #1 of a specific sequence, such that the function for calculating the transmission bandwidth of the D2D signal on the basis of the detection result is needed. For this purpose, at least one value capable of being used as the transmission bandwidth of the signal #1 may be fixed in advance. Specifically, the available value may be determined by the system bandwidth. Especially, if the system bandwidth is large, many more RBs may be used for D2D communication of each UE, and the D2D communication available value of each UE may be increased according to the system bandwidth.

In addition, the spacing corresponding to a predetermined frequency domain must always be present between the signals #1 of two UEs, such that the boundary of D2D signals from two UEs can be easily recognized. Therefore, when two contiguous frequency resources are used for transmission of the signal #1, assuming that only one UE uses two frequency resources to transmit the signal #1, the frequency domain in which the signal #1 is not transmitted is not present. However, assuming that two frequency resources are used to transmit the signal #1 of two UEs, the frequency domain in which the signal #1 is not transmitted is present, such that the reception UE can easily discriminate between two cases.

Figure 25:
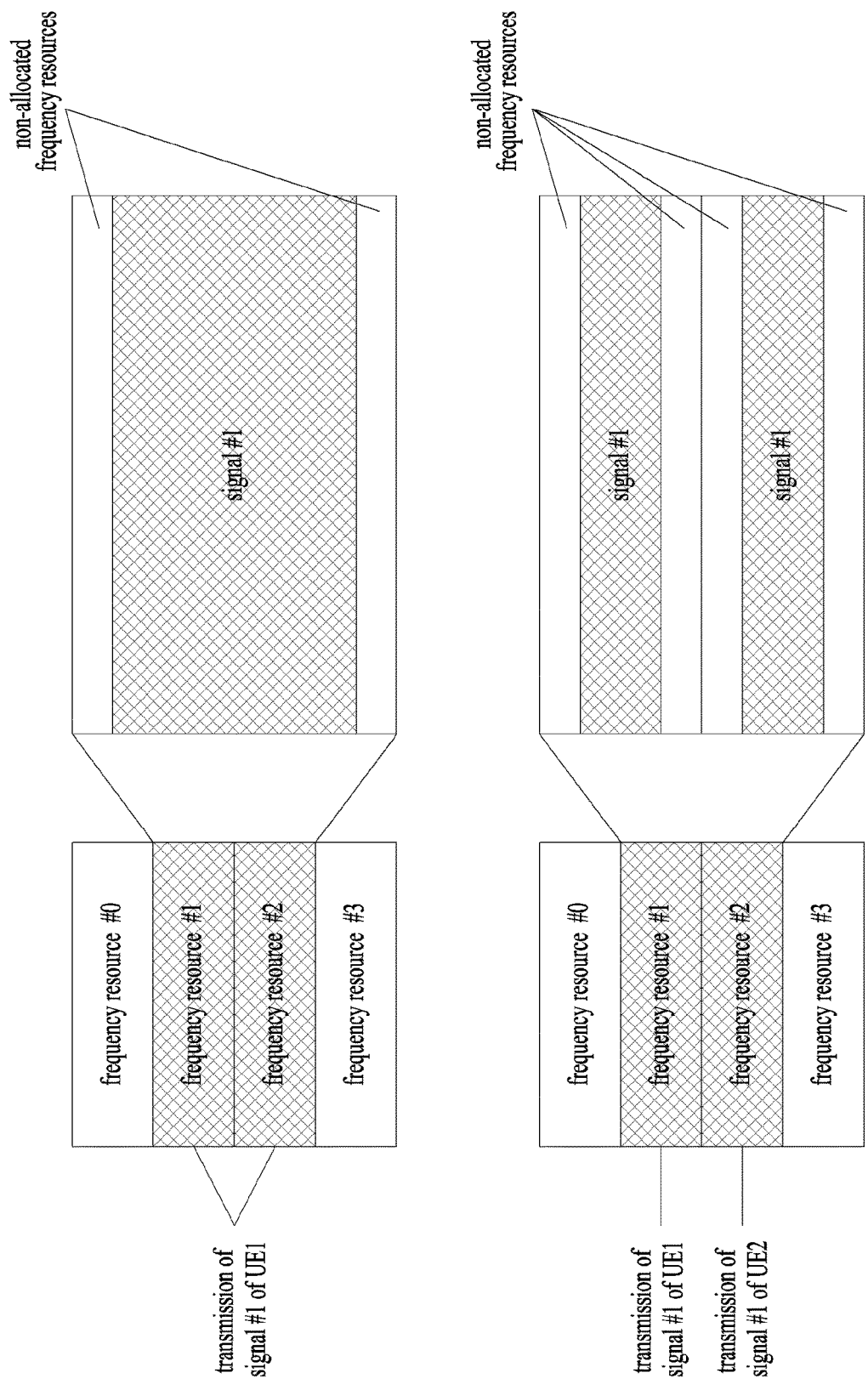
FIG. 25 illustrates one allocation example of a frequency resource for D2D communication according to an embodiment of the present invention.

FIG. 25 illustrates one allocation example of a frequency resource for D2D communication according to an embodiment of the present invention. Referring to FIG. 25, each UE may prevent some frequency resources corresponding to the edge of the frequency domain that is always used in UE data communication from being used for transmission of the signal #1. As a result, if two UEs transmit the signal #1 using contiguous frequency resources, an empty region occurs between two signals #1, such that the reception UE can recognize the empty region.

Alternatively, in order to avoid the change operation of the transmission bandwidth of the signal #1, instead of using the transmission bandwidth of the signal #1 that is fixed to one value irrespective of the data transmission bandwidth, the transmission bandwidth of data can be recognized on the basis of information contained in the signal #1. For example, the transmission bandwidth of data may be recognized from parameters used in generation of the signal #1. In more detail, the parameter candidate values used in generation of the signal #1 may be divided into a few parameter groups, and one parameter group may interact with one Tx bandwidth of the signal #1 (i.e., one Tx bandwidth of data). Therefore, although the signal #1 is transmitted through the fixed bandwidth, the resource position of the lagging data can be recognized on the basis of the Tx bandwidth of data interacting with the parameter.

Figure 26:
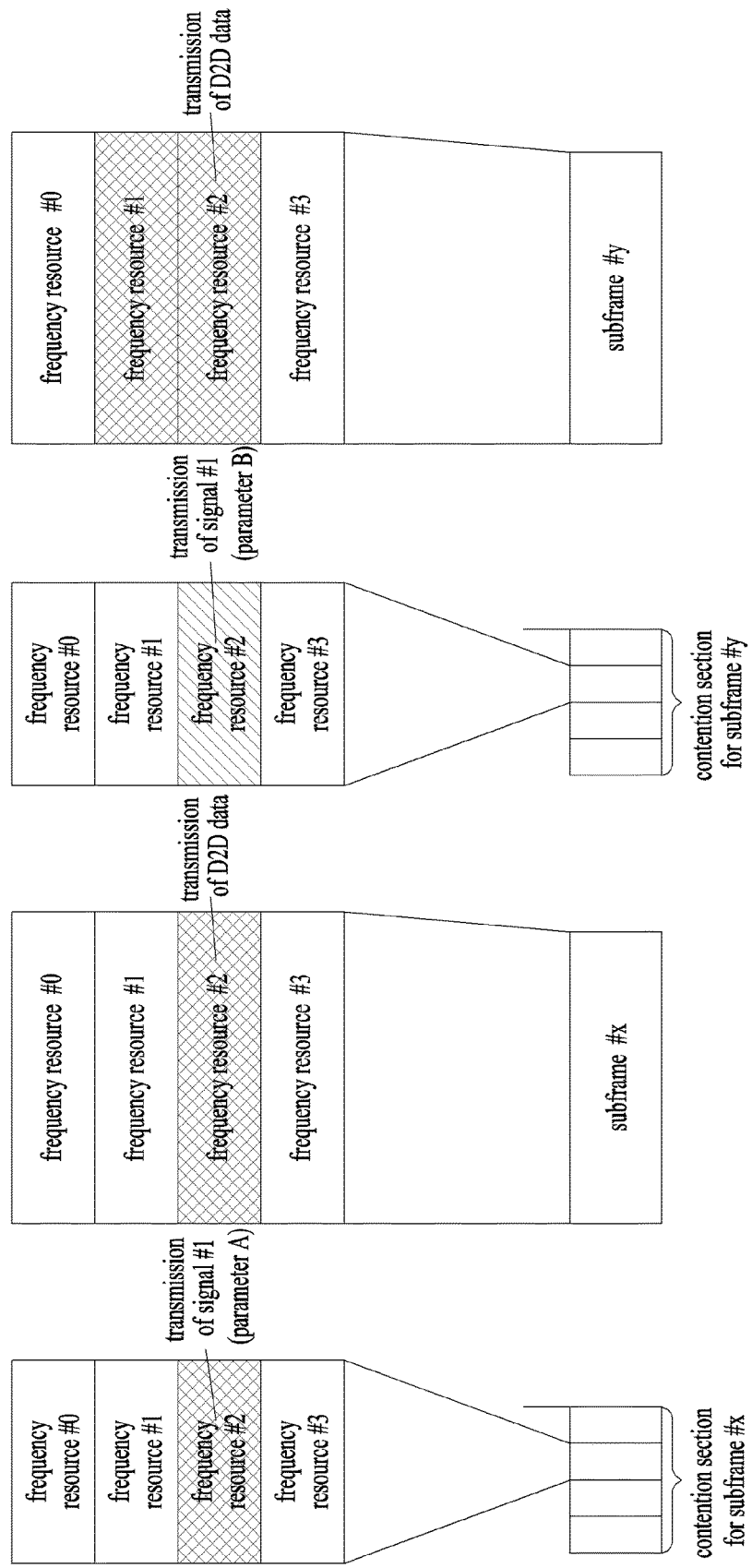
FIG. 26 is a conceptual diagram illustrating a method for recognizing a transmission (Tx) bandwidth on the basis of a generation parameter of Signal #1 according to an embodiment of the present invention.

FIG. 26 is a conceptual diagram illustrating a method for recognizing a transmission (Tx) bandwidth on the basis of a generation parameter of Signal #1 according to an embodiment of the present invention.

Referring to FIG. 26, after the UE uses only one frequency resource unit in the subframe #x, the UE may use two frequency resource units in the subframe #y. Needless to say, the parameter A corresponding to one resource unit may be used in transmission of the signal #1 corresponding to the subframe #x, and the parameter B corresponding to two resource units may be used in transmission of the signal #1 corresponding to the subframe #y.

The operation of FIG. 26 may indicate that the method for designating the resource index for D2D data through the parameter of the signal #1 shown in FIG. 23(a) can be extended in such a manner that several resource indexes can be designated. Alternatively, when the resource index to be used in data communication is designated for the signal #1 shown in FIG. 23(b) through some bit fields, a plurality of resource indexes may be used, such that communication of various bandwidths can be achieved.

In the case in which the operation of FIG. 26 is carried out, the reception UE may designate the position of frequency resources needed for data transmission not only through the transmission position of the signal #1 but also through the bandwidth value denoted by the signal #1. In this case, the frequency resource corresponding to the data bandwidth may be utilized for data communication according to a predetermined rule on the basis of Tx resources of the signal #1.

Figure 27:
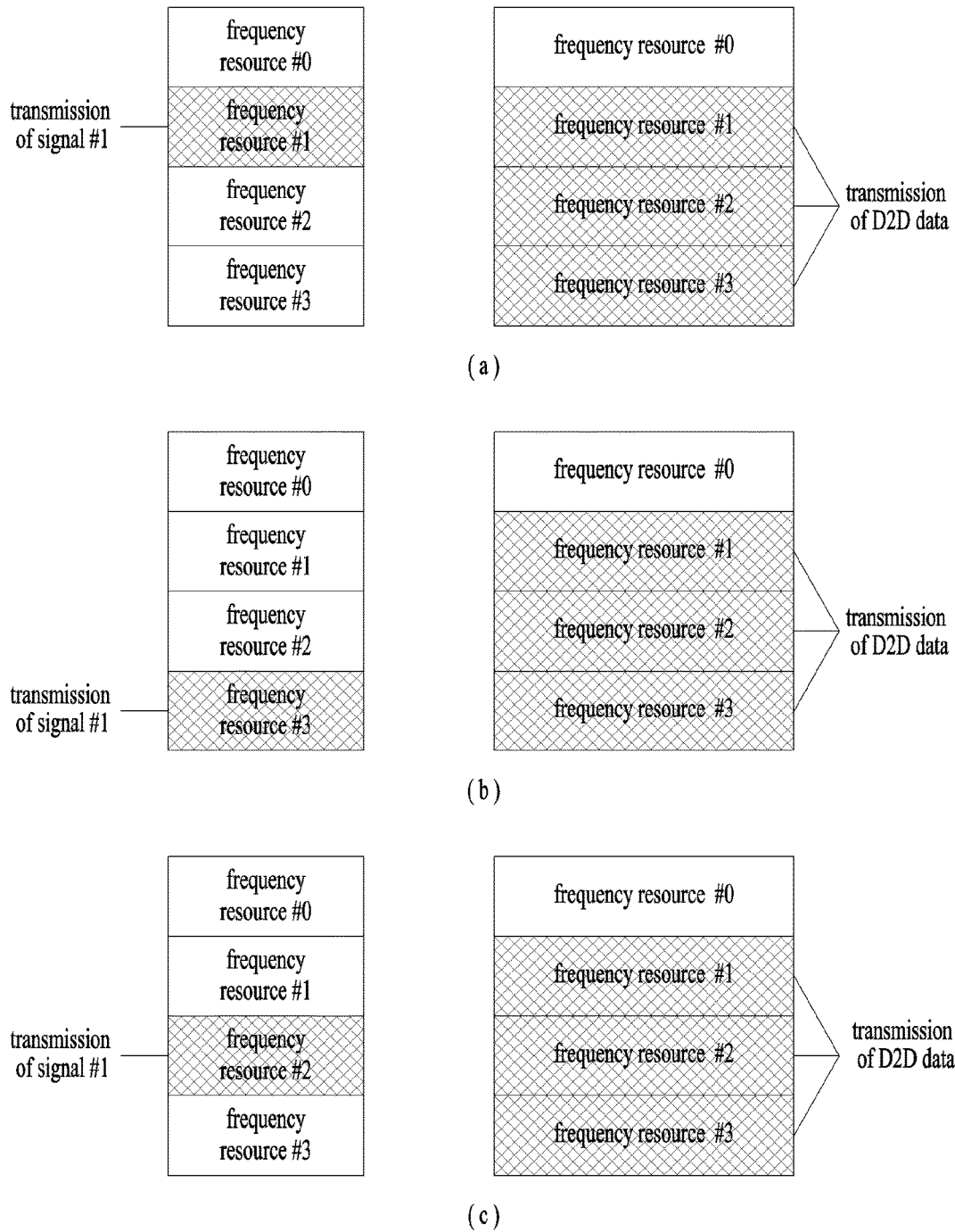
FIG. 27 is a conceptual diagram illustrating a method for designating the position of a frequency resource needed for data transmission on the basis of the transmission position of Signal #1 and a bandwidth value denoted by Signal #1 according to an embodiment of the present invention.

FIG. 27 is a conceptual diagram illustrating a method for designating the position of a frequency resource needed for data transmission on the basis of the transmission position of Signal #1 and a bandwidth value denoted by Signal #1 according to an embodiment of the present invention. Specifically, it is assumed that the signal #1 may use only one frequency resource whereas 3 frequency resources are used as data as shown in FIG. 27.

FIG. 27(a) illustrates an exemplary case in which the signal #1 is transmitted to a frequency resource having the lowest index from among frequency resources needed for data transmission. FIG. 27(b) illustrates an exemplary case in which the signal #1 is transmitted to a frequency resource having the highest index from among frequency resources needed for data transmission. FIG. 27(c) illustrates an exemplary case in which contiguous frequency resources are used for data transmission on the basis of frequency resources through which the signal #1 is transmitted. Preferably, FIG. 27(c) illustrates that the resource #2 having the same position is primarily allocated, and the contiguous resources #1 and #3 may then be sequentially allocated.

When the operation of FIG. 27 is carried out, whereas the signal #1 is not transmitted to some frequency resources, and D2D data may be transmitted to the some frequency resources. As a result, the UEs having measured interference in a transmission section of the signal #1 may have difficulty in using the measurement result as an interference estimation value for use in D2D data resources. In order to address this issue, the UE having transmitted the signal #1 may transmit a predetermined signal using frequency resources to be used when the UE will transmit D2D data in future in the same situation as in FIG. 27, such that an interference level observed by another UE may be set to the same interference value not only in the section of the signal #1 but also in the section of D2D data.

Specifically, the above-mentioned operation may be effectively used in the case in which various information (e.g., the indicator bit for indicating the resource index or the ID of the transmission UE) regarding the Tx signal is transmitted through the signal #1 as shown in FIG. 23(b). From the viewpoint of the reception UE, it is necessary for the reception UE to decode the indicator bit transferred through the signal #1 using only a single frequency resource unit, and such decoding performed in a plurality of frequency resource units need not be carried out.

However, when a predetermined signal is transmitted to measure interference in another frequency region to which the indicator bit is not transmitted, the corresponding signal has only an objective to indicate the interference level to be generated by the corresponding transmission UE, such that the actually transmitted signal may be an arbitrary signal. However, only Tx power should be maintained at the same level as in the data region, or should be higher or lower than the transmission power of the data region by a predetermined value. For example, as can be seen from FIG. 27(a), the information indicator bit regarding the Tx signal is transmitted only in the frequency resource #1 acting as the transmission resource of the signal #1, and signals arbitrarily generated by the transmission UE may be additionally transmitted in the remaining resources (frequency resources #2 and #3) to be utilized in the subsequent D2D data transmission such that interference of another UE can be measured using the additionally transmitted signals.

In the meantime, as one modification of the method for indicating the position of D2D data Tx resources using the transmission resource position of the signal #1, not only the D2D Tx resource position but also the D2D Tx resource bandwidth may also be indicated as the Tx resource position of the signal #1. For example, the contention slot is divided into a few groups, and different Tx bandwidths of D2D data are allocated to respective groups, such that the signal #1 can be transmitted in the contention slot contained in the group interacting with the corresponding bandwidth when the UE desires to transmit D2D data having a specific bandwidth. As a result, although the reception UE does not adjust the bandwidth of the signal #1 or does not indicate the Tx bandwidth of D2D data through the sequence or indicator of the signal #1, the reception UE can easily recognize which bandwidth will be used in the subsequent D2D data transmission on the basis of the reception resource position of the signal #1.

Figure 28:
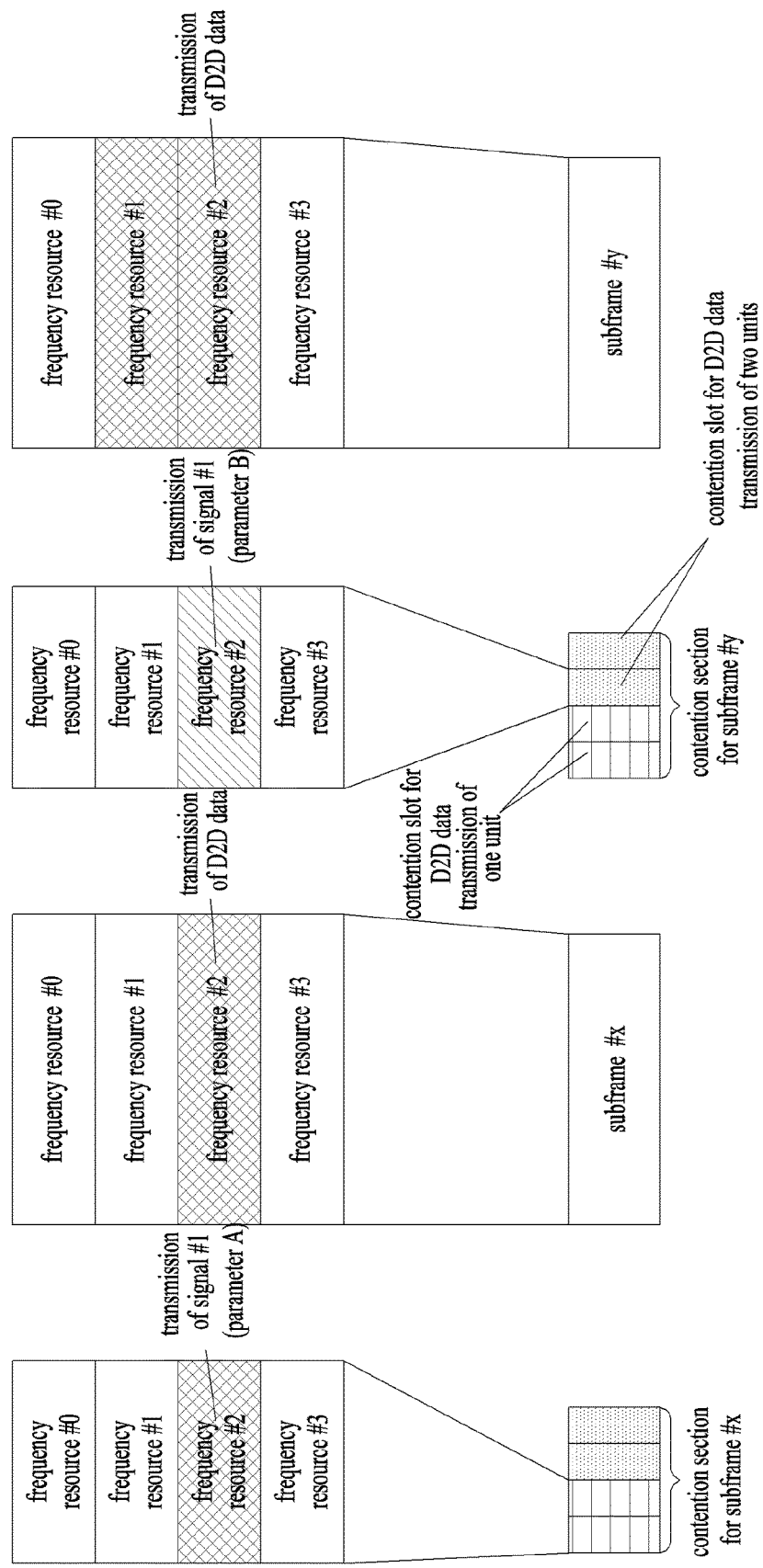
FIG. 28 is a conceptual diagram illustrating a method for indicating not only the position of a D2D transmission (Tx) resource but also a bandwidth of a D2D transmission (Tx) resource using the position of transmission (Tx) resource of Signal #1 according to an embodiment of the present invention.

FIG. 28 is a conceptual diagram illustrating a method for indicating not only the position of D2D transmission (Tx) resource but also a bandwidth of D2D transmission (Tx) resource using the position of transmission (Tx) resource of Signal #1 according to an embodiment of the present invention.

Specifically, as can be seen from FIG. 28, two front contention slots from among 4 contention slots interacting with a single D2D data subframe may be interoperable with one case in which only one frequency resource is used, and two rear contention slots may be interoperable with the other case in which two frequency resources are used. As a result, in the case of the subframe #x in which one frequency resource is used, the signal #1 is transmitted to one of the two front slots. In the case of the subframe #y in which two frequency resources are used, the signal #1 is transmitted to one of the two rear slots.

As a method for allowing each contention slot to interact with the D2D data Tx bandwidth, a series of preceding slots may first interact with a small bandwidth, and the next slots may then interact with the small bandwidth, such that such interactions may be sequentially carried out. Specifically, the above-mentioned scheme may first occupy the contention slot when the small bandwidth is used, such that priority may be assigned to UEs attempting to use a relatively small bandwidth and many more UEs can share necessary resources therebetween. Alternatively, individual contention slots may sequentially interact with individual data bandwidths, such that UEs attempting to use other bandwidths can contend with each other in a relatively fair manner.

As described above, when the signal #1 is transmitted and the position of interacting D2D data Tx resource is recognized, some parts of all attributes of the signal #1 and some parts of D2D data transmission attributes may interact with each other as necessary. As a representative example, the seed value of the reference signal (i.e., DM-RS) may be used.

The seed values of the reference signal (or, when the signal #1 is composed of a sequence, the sequence may be used as the reference signal) of the signal #1 may be entirely or partially identical to the seed values of the D2D data reference signal, such that it may be recognized which reference signal (RS) can be used to demodulate the D2D data signal in the corresponding resource when the reception UE detects the signal #1. In this case, the seed value may be exemplarily set either to a value for initializing the shift register configured to generate the signal, or to a cyclic shift (CS) value associated with this initialization value.

Particularly, assuming that the Tx UE selects only one from among several seed values and transmits the selected seed value, the reception (Rx) UE compares available seed values with each other one by one such that the Rx UE must recognize which value has been actually used. Assuming that all or some parts of the seed values are identical, it is necessary for the Rx UE to perform the above comparison process of seed values only in the reception operation of the signal #1, resulting in reduction of the UE reception operation complexity.

More preferably, the Tx UE may transmit the same seed value as the RS to be used in D2D data to be transmitted by the Tx UE, as the signal #1, and/or the Tx UE may transmit the signal generated by the same cyclic shift (CS) as the signal #1. In this case, the signal #1 may appear in the form of a predetermined number of successive symbols. Specifically, since several symbols are used, the above operation can be easily performed even when a sufficient amount of energy is used to detect the signal #1 using only one symbol.

When transmission of an urgent signal such as a rescue message is attempted according to the above-mentioned principles, the transmission process of the signal #1 or the signal #2 is omitted, and D2D data transmission may be immediately performed as necessary. In this case, the transmission UE may select an arbitrary subframe and the frequency domain, such that D2D data can be immediately transmitted. However, when a prohibition signal of D2D data transmission is received at a specific subframe by another UE, the corresponding subframe must be excluded from resource selection.

The following description will disclose a method for allowing each UE to determine the position of resources needed to transmit the signal #1 and/or D2D data when the UE reserves a specific resource and another UE avoids collision on the basis of the reserved resource through the Tx/Rx process of the signal #1.

If resources of the same time are divided into frequency domains, transmission based on only one frequency resource does not encounter interference in the remaining frequency resources. However, it is impossible to implement perfect orthogonality of resources when the actual Tx circuit is configured, some parts of Tx power based on one frequency resource may also appear in the remaining frequency resources. This operation will hereinafter be referred to as in-band emission. This in-band emission in D2D signal multiplexing based on orthogonal resources in the frequency domain may cause interference.

Figure 29:
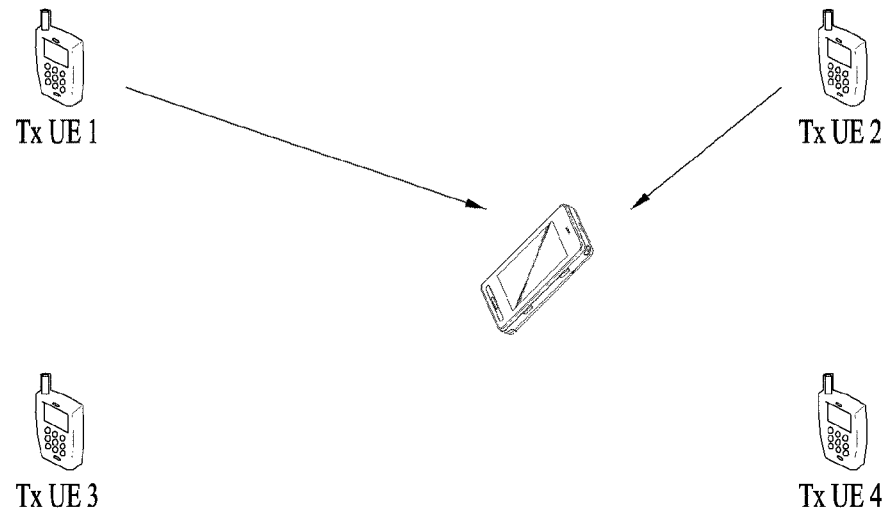
FIGS. 29 and 30 are conceptual diagrams illustrating a method for minimizing an in-band emission action.
Figure 30:
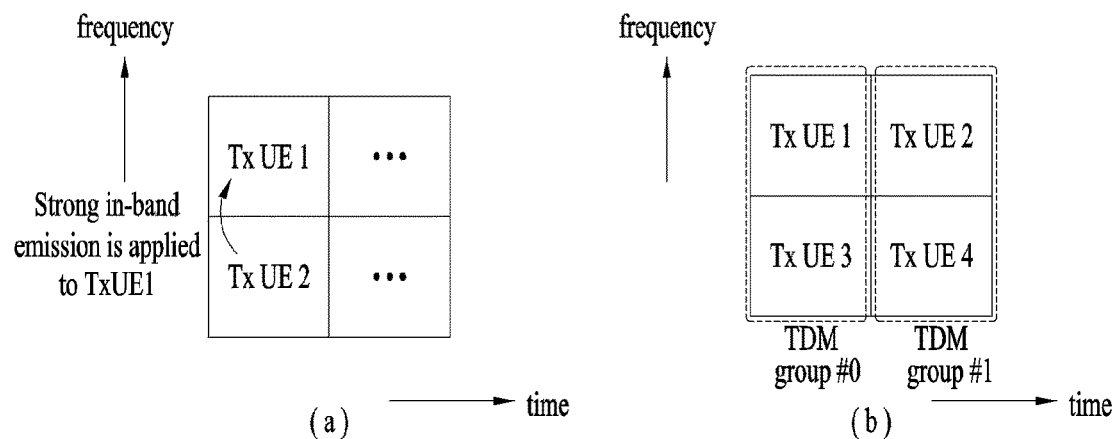

A method for properly adjusting the amount of time resources so as to minimize the in-band emission effect may be used. FIGS. 29 and 30 are conceptual diagrams illustrating a method for minimizing an in-band emission action.

If Tx UEs and Rx UEs are present as shown in FIG. 29, it is assumed that Tx UE1 and Tx UE2 use the same time resources and are FDM-processed as shown in FIG. 30(a). When the Rx UE receives signals from the Tx UE1, the Rx UE may be greatly affected by the in-band emission from the Tx UE2. Even when signals are received from the Tx UE2, the Rx UE may be slightly affected by the in-band emission from the Tx UE1.

Therefore, when Tx UEs located at a remote site are TDM-processed on the same resources and allocate the TDM result at different frequency resources, the near-far problem may occur as described above. That is, assuming that neighboring UEs are combined by a cluster or the like and TDM processing is performed as shown in FIG. 30(b), the in-band emission influence can be reduced.

In order to maximize the above effect, it is preferable that contiguous or neighbor UEs use different frequencies at the same time resources. Such resource allocation may be achieved on the basis of Tx/Rx of the signal #1. For example, a specific UE receives the signal #1 such that it can recognize which time resource will be used when a contiguous UE (having high Rx power of the signal #1) located adjacent to the specific UE transmits the D2D signal. In this case, although it is assumed that a specific resource (e.g., a specific frequency resource of a specific contention slot of FIG. 24) for the signal #1 interacts with a specific D2D Tx resource, the above-mentioned operation can also be applied to the case in which the position of D2D data Tx resource is recognized using different attributes of the signal #1.

Each UE configured to await a transmission time of the signal #1 according to a backoff result may measure contention slots through which the signal #1 is transmitted, the time domain interacting with the slot in which the signal #1 another UE is detected at high Rx power is first set to the Tx time region of D2D data, and the frequency resource is selected by other references. In addition, transmission of signal #1 is achieved using a resource for the signal #1 corresponding to the selected resource, such that the corresponding resource is reserved.

For example, the UE may search for a combination of a contention slot (to which the signal #1 having the highest Rx power from among the received signals #1) and a frequency resource. That is, the UE may search for the resource for the signal #1, and some parts of the same time resources as the data Tx resources interacting with the corresponding contention slot are not used by other UEs, such that the resources having low Rx power may be used as D2D data Tx resources.

Briefly, the UE may sequentially arrange resources for the received signals #1 until reaching a specific time according to the order of Rx power, may search for resources for N high-order signals #1, and may set a time domain in which resources for the corresponding signals #1 interact with each other to the Tx time domain of D2D data. Assuming that several time domains are set to the Tx time domain of D2D data, some time/frequency resources from among the corresponding time resources are not used by other UEs in the same manner as described above, such that resources having low Rx power are selected and then used as the D2D data Tx resources.

Alternatively, the UE combines resources for the signal #1 interacting with the same time resources into a predetermined number of groups, and may arrange the corresponding groups as a maximum value of Rx power at a resource for each signal #1 contained in each group. Thereafter, N high-order groups are selected, such that the signal #1 of the corresponding UE and/or the Tx time region of the D2D data may be established. Briefly, resources for the signal #1 appearing in the same contention slot may be combined into one group, or resources for the signal #1 appearing in several contention slots may be combined into one group so as to reduce the number of groups.

In this case, reception of the signal #1 may indicate that the UE has successfully detected the signal #1. Alternatively, additional conditions may be applied to the case in which the signal #1 has been successfully detected, such that some cases in which the Rx power is higher than a minimum reference value may be indicated by such reception of the signal #1. In this case, the minimum reference value of the Rx power is adjusted so that the size of a UE group contained in the same subframe may also be adjusted. That is, if the reference value is relatively increased, the near UE will primarily select only time resources needed for transmission of the signal #1, such that a geographical region of a series of UE groups configured to use different frequencies in the same subframe may be reduced in size. In contrast, assuming that this reference value is reduced, a UE located at a remote site may attempt to use time resources needed for transmission of the signal #1, such that a geographical region of a series of UE groups configured to use different frequencies in the same subframe may be increased in size.

Assuming that the signal #1 is not received in the resource set needed for the signal #1 interacting with a specific time resource for D2D data, the corresponding resource may be considered identical to other resources having the same condition, and may be contained in the D2D resource selection process according to a secondary reference. In this case, the secondary reference may be used to select resources to be used for the actual signal #1 and/or resources to be used for D2D data transmission on the basis of the Rx power of the signal #1. Needless to say, the secondary reference may be configured in the form of random resource selection. Alternatively, the secondary reference may be implemented by selecting resources having the lowest Rx energy or by selecting one of some low-order resources such that interference between the D2D signals can be minimized.

For example, it is assumed that a specific UE has received the signal #1 having high power at a specific resource for the signal #1 of a specific contention slot. According to the above-mentioned operation, the corresponding UE will attempt to transmit D2D data using different frequencies at D2D data time resources interacting with the resources for the corresponding signal #1. As a result, the D2D data Tx resources of the UE may be selected according to the secondary reference, such that the signal #1 can be transmitted. However, in the case of using D2D data resources interacting with signal-#1 resources in which the signal #1 having high power is detected, valid D2D data Tx resources may not remain in the D2D data resources.

For example, assuming that the UE detects either the signal #1 having a predetermined level or higher or the energy having a predetermined level or higher in all the signal-#1 resources of the contention slot interacting with the corresponding time, this means that all D2D data Tx resources belonging to the corresponding time have already been occupied by other UEs. If the UE detects this situation, D2D data transmission may be discarded in D2D data interacting with the resources for the signal #1, and other time resources may be searched for in the D2D data. That is, the UE may search for the resources for the signal #1 in which the signal #1 is received at high power, and may determine whether a transmittable resource is contained in D2D data resources of the same time as in the searched resources. Alternatively, high Rx power of the signal #1 may be discarded, and resources to be used by the UE may be selected only using the above secondary reference. Alternatively, the process of searching for the signal#1-resource in which the signal #1 is received at the next high power is performed a predetermined number of times, and necessary resources may be selected only using the secondary reference.

In another method, Rx power of the signal #1 may also be contained in the secondary reference as necessary. For example, each D2D resource may be selected according to a specific reference denoted by a function between Rx energy of the signal#1-resource and Rx power of the signal #1 received at the same slot as in the corresponding signal#1-resource.

A value corresponding to the function is increased in inverse proportion to Rx energy of the signal#1-resource, such that the possibility of selecting the corresponding resource may be increased. In addition, the value of the signal #1 received at different frequencies of the same time resources is increased in proportion to Rx power (specifically, a maximum value from among power values of the signal #1 at the same time), such that the possibility of resource allocation shown in FIG. 30 may be increased. Of course, it is assumed that a resource causing a maximum function value may be selected for convenience of description.

For example, this function may be denoted by $-E_{n,m}+a*P_n$. In this function, $E_{n,m}$ is an energy measurement value of the resource for the signal #1 interacting with the n-th time resource and the m-th frequency resource, $P_n$ is a maximum value from among Rx power values of the received signal #1 in the n-th time resources, and $a(>0)$ is a coefficient for deciding a weight between two values. Needless to say, Rx power ($P_n$) of the signal #1 may be set to zero (0) such that the signal #1 can be used only in the case in which the corresponding Rx power is equal to or higher than a predetermined value. If the maximum Rx power of the signal #1 received at the n-th time resource is less than the predetermined value, the corresponding time resource may determine no reception of the signal #1 such that it can be processed in the same manner as in other time resources.

Figure 31:
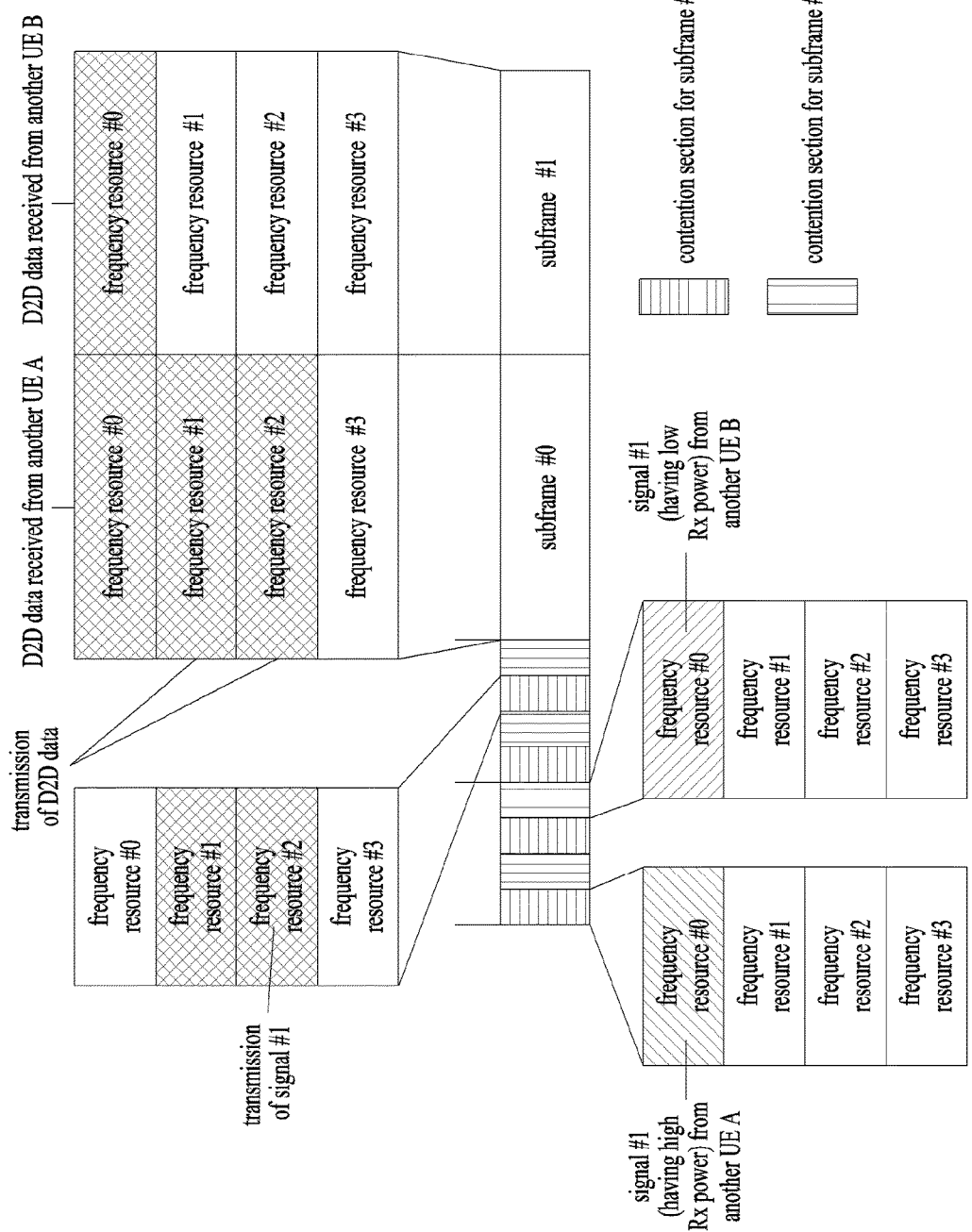
FIG. 31 illustrates a modification example of the resource structure shown in FIG. 24.

FIG. 31 illustrates a modification example of the resource structure shown in FIG. 24. In FIG. 31, the transmission candidate sections of the signal #1 regarding each D2D data time resource may appear alternately.

Referring to FIG. 31, a specific UE may observe a signal #1 transmission section corresponding to each D2D subframe located at the front of the time domain (e.g., a time domain in which a backoff process is being conducted), such that it can estimate how much power will occur in a certain frequency resource of a certain D2D subframe. Time resources through which the signal #1 and/or data will be transmitted by the UE may be selected according to the above-mentioned scheme on the basis of the estimation result, and an appropriate frequency resource from among the time resources is then selected, such that the signal #1 can be transmitted in the contention slot located at the rear of the time domain (e.g., a backoff completion time, and a time section located after the backoff completion time).

As can be seen from FIG. 31, the UE may observe 6 contention slots (Slot #0 to Slot #5). It is assumed that the signal #1 having relatively high power is detected in the slot (i.e., slot #0) interacting with the subframe #0, and the signal #1 having relatively low power is detected in the slot (i.e., slot #3) interacting with the subframe #1, and it is also assumed that each detected signal #1 has already used the frequency resource #0.

The corresponding UE may determine the subframe #1 to be D2D use resources. The $7^{th}$ slot (i.e., Slot #6) from among the interacting contention slots may be selected as transmission resources of the signal #1, the frequency resource #0 in which the signal #1 has already been detected is excluded, such that only the frequency resources #1 and #2 can be used by the UE.

In conclusion, assuming that N D2D time resources are present, N contention slots are used as a single backoff unit. In other words, if the backoff value is reduced by one, it may be possible to pass N contention slots without transmission of the signal #1 in the N contention slots. In FIG. 31, the backoff value may be exemplarily set to 3. In more detail, since the backoff basic unit is composed of two contention slots, the backoff counter is set to zero (0) after lapse of 6 contention slots.

Meanwhile, assuming that a specific UE transmits the signal #1 using resources for the signal #1 of a specific contention slot, this means that the corresponding UE has reserved the interacting D2D data resources. That is, the corresponding UE may inform other UEs that the corresponding UE has already reserved the corresponding D2D data resources, by continuously transmitting the signal #1 after lapse of a time point at which the corresponding UE has initially transmitted the signal #1. Therefore, assuming that a specific UE selects specific D2D data resources and transmits the signal #1 at resources for the specific signal #1 corresponding to the selected result, the corresponding UE may transmit the signal #1 until the resource section (i.e., the contention section) for a series of signals #1 is terminated in all signal#1 resources interacting with UE-selected D2D data resources from among the signal#1 resources appearing after lapse of the contention slot. Although the UE incapable of detecting transmission of the signal #1 in a specific contention slot due to instantaneous channel attenuation is present, there is a possibility that the UE can recognize the resource reservation situation by detecting the signal #1 in the subsequent contention slot.

The method for employing reception of the signal #1 of another UE can be implemented even when the signal #1 different in structure from the D2D data channel is not defined. Assuming that the frequency/resource resources used in D2D data channel transmission by one UE are predetermined according to the predetermined rule, another UE observes the predetermined resource, attributes (e.g., an interference level, or Rx power of the D2D signal received from the corresponding UE) of resources to be used by the corresponding UE in a subsequent process can be recognized. As a result, the known signal (e.g., DM-RS) transmitted in the legacy D2D channel may be regarded as the signal #1, and the above-mentioned operation can be applied to the embodiment. That is, the D2D data channel may be transmitted using frequency resources (having low interference or low measurement energy) from among resources of the time domain in which DM-RS has been detected at high power in previous observation.

The resource allocation operation through transmission of the signal #1 and/or the signal #2 may be optionally performed only in the UE having Tx data at the start time of a specific D2D frame. In other words, the UE, which has data to be transmitted through D2D communication at the start time (i.e., at the appearance time of the contention slot) of the specific D2D frame, transmits the signal #1 in the contention slot, so that the UE can attempt to perform resource allocation in a subsequent D2D data subframe.

In contrast, although the specific UE does not have data to be transmitted through D2D communication at the start time of the specific D2D frame, data to be transmitted through D2D communication may occur in the center part of the corresponding D2D frame. Specifically, data to be transmitted through D2D communication may occur after lapse of the contention slot. The UEs may stay in the standby mode until reaching the next D2D frame, and may transmit the signal #1 and D2D data. However, an excessive time delay may occur in initial D2D data transmission.

In order to address this issue, the UE attempting to transmit new D2D data in the middle of the D2D frame may measure an interference level at each D2D data resource on the basis of either the signal #1 or D2D data having been transmitted in the corresponding D2D frame, and may determine its own Tx resources on the basis of the measurement result.

Figure 32:
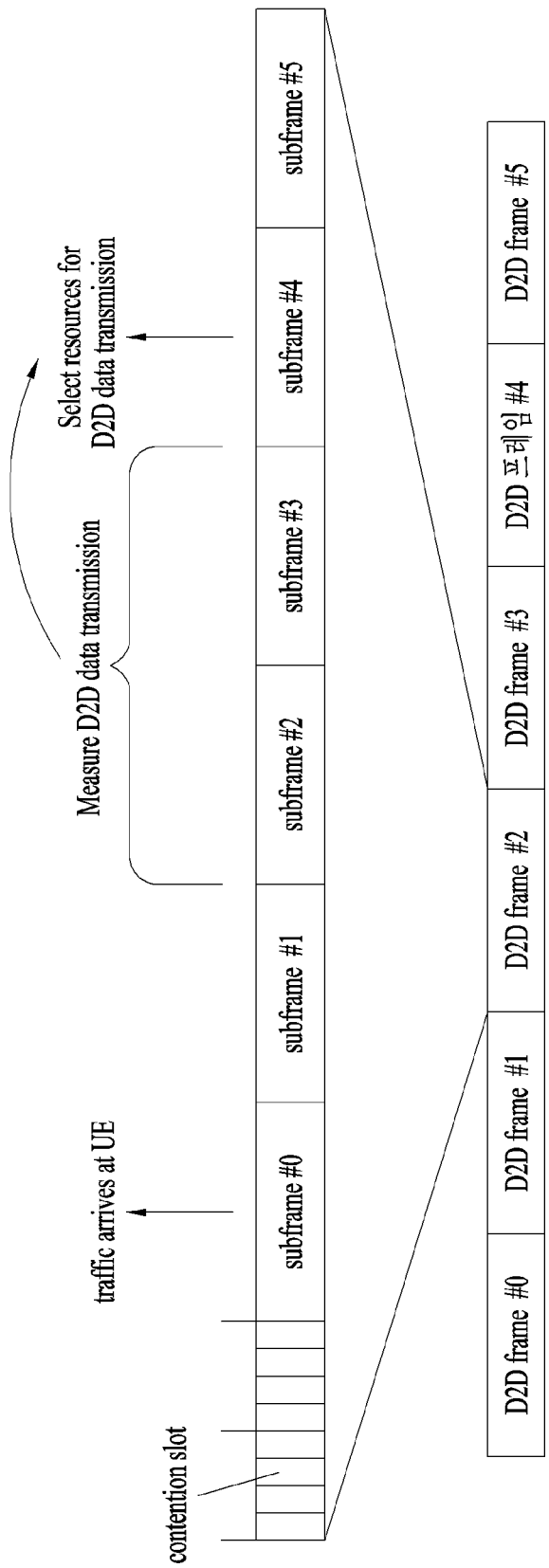
FIG. 32 is a conceptual diagram illustrating a method for transmitting D2D data in the middle of a D2D frame according to an embodiment of the present invention.

FIG. 32 is a conceptual diagram illustrating a method for transmitting D2D data in the middle of a D2D frame according to an embodiment of the present invention. In FIG. 32, the UE may measure D2D data subframes located before a start subframe in which the UE attempts to start D2D data transmission, and may select resources to be used for transmission of D2D data by applying the resource selection scheme based on the signal #1 to the measurement result.

FIG. 32 exemplarily illustrates that 6 subframes are present in one D2D frame and three D2D subframes are allocated through only one contention. The subframes (#0, #2, #4) may correspond to three subframes to be allocated through only one contention, and the subframes (#1, #3, #5) may also correspond to three subframes to be allocated through one contention. In addition, as can be seen from FIG. 32, traffic may be generated in the UE in the middle of the subframe #0, and measurement of legacy D2D transmission may be carried out in the subsequent subframes (#2, #3). As a result, an interference situation in the subframes (#4, #5) can be estimated on the basis of the above-mentioned result such that appropriate resources can be selected.

According to the above-mentioned operation, the UE scheduled to transmit D2D data in the middle of the D2D frame may regard the D2D data subframe located before the Tx start time as a kind of the signal #1, and may perform interference estimation and the resource decision process. In order to guarantee minimum accuracy of the interference estimation value, the UE configured to transmit D2D data in the middle of the D2D frame may measure D2D resources during a minimum of a predetermined subframe. In addition, in order to minimize the number of cases in which several UEs complete measurement and then initiate transmission, if the UE transmits D2D data in the middle of the D2D frame, the UE does not perform measurement and D2D data transmission as soon as traffic is generated, but the UE selects the D2D data transmission start time at random, continuously measures D2D resources until reaching the Tx start time or measures D2D resources during a predetermined time just before the Tx start time, reflects the measurement result, such that the UE can determine its own data transmission resources.

In addition, the UE having no intention to transmit data at the D2D frame start time may measure the contention slot as necessary. If traffic is generated in the middle of the D2D frame, the UE may select resources to be used on the basis of the measurement value obtained from the contention slot. The measurement value for use in this contention slot may be combined with the measurement value of the data subframe, such that the combined result may also be used to select the D2D data Tx resources.

As described above, the signal #1 is not transmitted in the specific D2D frame, and interference caused by the UE configured to start data transmission in the middle of the D2D frame cannot be recognized by the legacy D2D data transmission UEs, such that it is necessary to maximally protect the legacy UE transmission. For this purpose, the following restriction may be given to the UE that starts transmission in the middle of the D2D frame without transmitting the signal #1 at a specific D2D frame. Provided that D2D data resources capable of satisfying such restriction are not present, transmission of the corresponding UE may be delayed to the next D2D frame.

In the case of D2D data transmission configured to start in the middle of the D2D frame, the maximum Tx power of the D2D data transmission may be less than the maximum Tx power of transmission (i.e., transmission having been conducted by the process of signal #1) starting from the beginning of the D2D frame.

D2D data resources occupied by D2D data transmission starting in the middle of the D2D frame may be restricted. For example, resources capable of being occupied by D2D data transmission starting in the middle of the D2D frame may be restricted to the case in which the interference level measured in the corresponding resource is equal to or less than a predetermined reference, such that only resources in which the legacy D2D communication is not present may be used.

In another example, resources capable of being occupied by D2D data transmission starting in the middle of the D2D frame may be restricted in a manner that the resources belong to a specific time and/or the frequency resource region, such that legacy D2D data transmission in which the remaining resources are used can be protected.

In another example, resources capable of being occupied by D2D data transmission starting in the middle of the D2D frame may be limited to resources in which another UE configured to use other frequency resources at the same time is not present, such that unexpected in-band emission interference may be reduced due to D2D data transmission starting in the middle of the D2D frame. In more detail, if some frequency resources of a specific subframe #n are used to allow the specific UE to transmit D2D data in the middle of the D2D frame, it is necessary to satisfy the condition in which interference measured at other frequency resources of the corresponding subframe #n (or the previous subframe in which the same interference as in the corresponding subframe #1 is predicted) should be equal to or less than a predetermined level.

Figure 33:
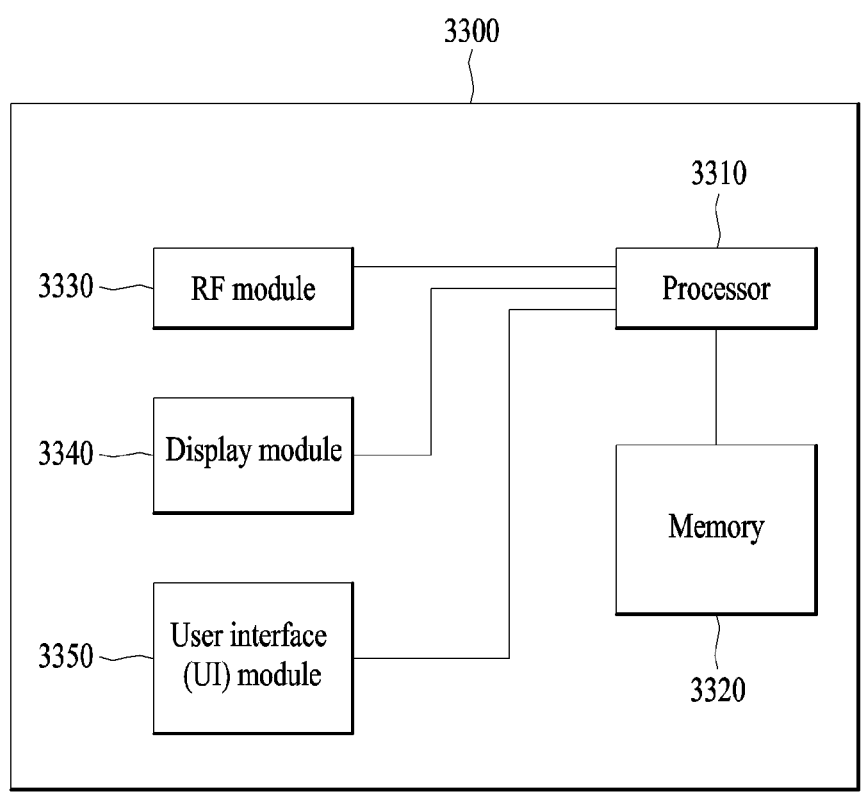
FIG. 33 is a block diagram of a communication apparatus according to an embodiment of the present invention.

FIG. 33 is a block diagram illustrating a communication apparatus in accordance with an embodiment of the present invention.

Referring to FIG. 33, a communication device 3300 includes a processor 3310, a memory 3320, an Radio Frequency (RF) module 3330, a display module 3340, and a user interface module 3350.

The communication device 3300 is illustrated for convenience of the description and some modules may be omitted. Moreover, the communication device 3300 may further include necessary modules. Some modules of the communication device 3300 may be further divided into sub-modules. The processor 3300 is configured to perform operations according to the embodiments of the present invention exemplarily described with reference to the figures. Specifically, for the detailed operations of the processor 3300, reference may be made to the contents described with reference to FIGS. 1 to 32.

The memory 3320 is connected to the processor 3310 and stores operating systems, applications, program code, data, and the like. The RF module 3330 is connected to the processor 3310 and performs a function of converting a baseband signal into a radio signal or converting a radio signal into a baseband signal. For this, the RF module 3330 performs analog conversion, amplification, filtering, and frequency upconversion or inverse processes thereof. The display module 3340 is connected to the processor 3310 and displays various types of information. The display module 3340 may include, but is not limited to, a well-known element such as a Liquid Crystal Display (LCD), a Light Emitting Diode (LED), or an Organic Light Emitting Diode (OLED). The user interface module 3350 is connected to the processor 3310 and may include a combination of well-known user interfaces such as a keypad and a touchscreen.

The above-described embodiments are combinations of elements and features of the present invention in a predetermined manner. Each of the elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. In the appended claims, it will be apparent that claims that are not explicitly dependent on each other can be combined to provide an embodiment or new claims can be added through amendment after the application is filed.

The embodiments according to the present invention can be implemented by various means, for example, hardware, firmware, software, or combinations thereof. In the case of a hardware configuration, the embodiments of the present invention may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In the case of a firmware or software configuration, the method according to the embodiments of the present invention may be implemented by a type of a module, a procedure, or a function, which performs functions or operations described above. For example, software code may be stored in a memory unit and then may be executed by a processor. The memory unit may be located inside or outside the processor to transmit and receive data to and from the processor through various well-known means.

The present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents and all changes coming within the meaning and equivalency range of the appended claims are intended to be embraced therein.

INDUSTRIAL APPLICABILITY

As is apparent from the above description, although the method and apparatus for allocating resources for UE-to-UE communication in a wireless communication system have been disclosed on the basis of application to 3GPP LTE, the inventive concept of the present invention is applicable not only to 3GPP LTE, but also to other wireless communication systems.

The invention claimed is:

1. A method of transmitting device-to-device (D2D) link signals at a user equipment (UE) in a wireless communication system, the method comprising:
   transmitting, to a target UE, a D2D link control signal for a D2D link data signal using a first resource having a specific index; and
   transmitting, to the target UE, the D2D link data signal using second resources,
   wherein a lowest index of the second resources is the specific index, and
   wherein information about a number of the second resources is included in the D2D link control signal.

2. The method according to claim 1, wherein transmitting the D2D link control signal comprises:
   generating a random number; and
   if the random number is equal to or less than a predetermined value, transmitting the D2D link control signal.

3. A user equipment (UE) in a wireless communication system, the UE comprising:
   a radio frequency (RF) module; and
   a processor configured to control the RF module,
   wherein the processor controls the RF module to transmit a device-to-device (D2D) link control signal to a target UE, and transmit the D2D link data signal to the target UE using second resources,
   wherein a lowest index of the second resources is the specific index, and
   wherein information about a number of the second resources is included in the D2D link control signal.

4. The UE according to claim 3, wherein the processor is further configured to generate a random number, and to transmit the D2D link control signal if the random number is equal to or less than a predetermined value.

* * * * *